(12) United States Patent
Marks et al.

(10) Patent No.: US 7,835,597 B2
(45) Date of Patent: Nov. 16, 2010

(54) TRANSPARENT CONDUCTING COMPONENTS AND RELATED ELECTRO-OPTIC MODULATOR DEVICES

(75) Inventors: Tobin J. Marks, Evanston, IL (US); Seng-Tiong Ho, Wheeling, IL (US); Jing Ma, Buffalo Grove, IL (US); Guoyang Xu, Newtown, PA (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 11/888,503

(22) Filed: Aug. 1, 2007

(65) Prior Publication Data
US 2008/0212914 A1 Sep. 4, 2008

Related U.S. Application Data

(63) Continuation-in-part of application No. 11/225,553, filed on Sep. 13, 2005, now abandoned.

(60) Provisional application No. 60/609,433, filed on Sep. 13, 2004, provisional application No. 60/704,644, filed on Aug. 2, 2005, provisional application No. 60/834,593, filed on Aug. 1, 2006.

(51) Int. Cl.
G02F 1/035 (2006.01)
(52) U.S. Cl. .......................................... 385/2; 359/245
(58) Field of Classification Search .................... 385/2; 359/245
See application file for complete search history.

(56) References Cited

U.S. PATENT DOCUMENTS

| | | | |
|---|---|---|---|
| 5,818,893 A | 10/1998 | Hettiarachchi | |
| 5,818,983 A | 10/1998 | Yoshimura et al. | |
| 5,887,116 A * | 3/1999 | Grote | 385/2 |
| 6,549,685 B2 | 4/2003 | Marks et al. | |
| 2005/0098726 A1 * | 5/2005 | Peumans et al. | 250/338.1 |

* cited by examiner

*Primary Examiner*—Jerry T Rahll
(74) *Attorney, Agent, or Firm*—Reinhart Boerner Van Deuren s.c.

(57) ABSTRACT

New electro-optic (EO) phase modulator devices and geometries, as can be constructed using a transparent conductive component.

23 Claims, 9 Drawing Sheets

TRANSPARENT CONDUCTING COMPONENTS AND RELATED ELECTRO-OPTIC MODULATOR DEVICES

This application is a continuation-in-part of and claims priority benefit from application Ser. No. 11/225,553 filed Sep. 13, 2005 now abandoned which claims priority from prior provisional application Ser. No. 60/609,433, filed Sep. 13, 2004 and prior provisional application Ser. No. 60/704,644, filed Aug. 2, 2005, and claims priority benefit from prior provisional application 60/834,593, filed Aug. 1, 2006, each of which is incorporated herein by reference in its entirety.

The United States government has certain rights to Grant No. DAAD-19-00-1-0368 from DARPA and Grant No. DMR-00769097 from the National Science Foundation to Northwestern University.

FIELD OF THE INVENTION

This invention relates to electro-optic modulators, modulator geometries, and the materials and methods used to fabricate such modulators.

BACKGROUND OF INVENTION

Over the past thirty years, significant time and effort has been dedicated to the study of various materials such as, $LiNbO_3$, III-V semiconductors, and organic polymers, to determine their respective characteristics for the fabrication and performance as electro-optic (EO) devices (e.g., modulators, waveguides, switches, emitters, detectors, and the like). For example, organic modulators have been demonstrated at operating frequencies as high as 113 GHz and a $V_\pi$ of approximately 0.8V. However, for applications to Radio-Frequency Photonics (RF Photonics) in which a high-frequency electrical signal is transmitted not via a metallic transmission line but via an optical fiber, a much lower modulation voltage of around 0.5V or smaller is required. It is well known that the power consumption of an electro-optic modulator is proportional to the square of the modulation voltage. Hence, other than RF Photonics applications, it is generally desirable to lower the switching or modulating voltage of an electro-optic modulators for the purpose of saving driving power. In addition, lowering the driving power also leads to lower heat dissipation, which will help in achieving higher-density device integration.

For a given electro-optically active material, the prior high-speed electro-optic device structures are limited in their ability to provide low voltage operation. Present high-speed electro-optic devices utilize metals as the voltage-conducting electrodes. Metals, however, are very absorptive with respect to an optical beam propagating within the electro-optically active material. This limits how close the metal electrodes can be, which subsequently limits the strength of the electric field achievable at the electro-optically active material and, hence, the modulator voltage. The present electro-optic modulator structures are thus incapable of achieving much lower modulation voltages without incurring higher optical losses. Such considerations make it difficult to achieve low modulation voltage, high integration density, or smaller device sizes, and consequently limit applications of such devices

SUMMARY OF THE INVENTION

In light of the foregoing, it is an object of the present invention to provide electro-optic devices, including, but without limitation, related modulator and waveguide devices and/or methods for their production and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of this invention to provide an electro-optic modulator device, in comparison to the prior art, with lower switching or modulation voltages achievable without incurring higher optical losses. Alternatively, it is a related object to provide such devices with switching or modulation voltages comparable to the prior art, but achievable with smaller device sizes.

It can be another object of the present invention, in conjunction with one of the preceding objectives to obtain or maintain high modulation frequency capability.

It can be another object of the present invention, in conjunction with one or more of the preceding objectives, to provide, in comparison with the prior art, a high-frequency modulator with lower voltage, lower driving power and/or higher integration density.

As provided above and elsewhere herein, in one aspect of the present invention, an objective of this invention is to provide an electro-optic device structure that reduces the driving voltage for a given electro-optic modulator device length and yet still maintains a reasonably high frequency of operation. Accordingly, using various embodiments of this invention, this and other objectives can be achieved by electro-optic modulator structures comprising exemplary transparent conducting (TC) components connected or coupled to electrode structures about electro-optic (EO) materials—such materials including but not limited to electrically poled polymers of the prior art, more recently developed self-assembled superlattice (SAS) organic materials, inorganic crystal electro-optic materials known and available in the art (e.g. Lithium Niobate ($LiNbO_3$) or Barium Titanate ($BaTiO_3$)), and III-V semiconductors (e.g., Gallium Arsenide (GaAs), Aluminum Arsenide (AlAs), Indium Phosphide (InP), Indium Ganium Arsenide Phosphide (InGaAsP)). Representative organic and/or superlattice materials and related device structures are described in U.S. Pat. Nos. 6,549,685; 6,033,774 and 5,156,198 each of which is incorporated herein by reference in its entirety.

In another aspect of the present invention, in several embodiments, the conductive components can be made of materials that are optically transparent and yet electrically conductive—referred to as transparent conductors (TC). Such transparent conducting components can impose a higher electric field across the EO channel waveguide, resulting in lower modulator switching voltage.

In yet another aspect of the present invention, such a device can comprise a TC on both the top and bottom or about the cladding regions of the EO material and be referred to as a vertical conduction structure, with the vertical direction perpendicular to the substrate on which the EO device layered structures are laid.

In yet another aspect of the present invention, such a device can comprise a TC on two sides of the cladding regions of the EO material and be referred to as a side-conduction structure.

In yet another aspect of the present invention, a TC component can comprise one or more of a class of materials known as transparent conducting oxides (TCO).

In yet another aspect of the present invention, two TC electrodes of a modulator device can be further electrically coupled to two metal electrodes that form RF traveling-wave electrodes of the sort useful for achieving higher frequency of operation.

In yet another aspect of the present invention, in the case of an organic electro-optic modulator, modulators can be fabricated using low processing temperatures in order not to adversely affect active electro-optic polymers. TC/TCO components can be deposited at low temperature on the electro-optic polymers or other EO materials using various methods, including a sputtering system such as Ion Assisted Deposition (IAD) system. A polymer layer can then be grown via spin coating on top of or adjacent a first TC/TCO component or via self-assembly method. A second TC/TCO component can then be deposited on top of or adjacent the electro-optic polymers. Using a polymer with reasonably high EO coefficient together with transparent conductive structures, optical intensity or phase modulators with a very high modulation speed (e.g., about 1~about 100 GHz) and very low switching voltages (e.g., about 0.1~about 5V) can be realized. In the case of poled polymer modulators, a TC component of this invention can also reduce the electrical poling voltage required to pole the EO polymer.

As demonstrated below, using transparent conductor structures of this invention can result in modulator switching voltages ranging from about 5 to about 10 times lower than that of conventional structure due to a corresponding 5-10× smaller effective spacing between the two electrodes. In the case of an organic electro-optic modulator, it can also reduce the electrical poling voltage by about 5-10× when TCs are used as electrodes to pole an EO polymer.

Without limitation, two general modulator embodiments are illustrated below: a vertical conduction structure and a side-conduction structure. Both can comprise TC/TCO materials to achieve low switching voltages and yet maintain high modulation frequency. A vertical conducting design or structure can be conducive for the case where a TC material has a refractive index lower than that of the waveguide core. A side-conduction design or structure can be conducive where a TC material has a refractive index equal to or higher than that of the waveguide core. This side conduction geometry can further provide the advantage of allowing a TC material to have higher material loss coefficient than with a vertical conduction geometry. In yet another advantage of the side conduction structure, it can be used to provide either vertically-oriented electric field or horizontally-oriented electric field. As would be understood in the art, a horizontal electric field can be often a preferred embodiment for certain inorganic-crystal based electro-optic materials.

Accordingly, this invention can meet one or more of the objectives provided or inferred from the preceding, and can be directed to optical intensity/phase modulation and, more specifically, to the design of modulator device structures that can (1) reduce the driving voltage of a polymer EO modulator, (2) without increasing device length, while (3) significantly lowering high modulation frequency.

Other objects, features, benefits and advantages of the present invention will be apparent from this summary and the following descriptions of certain embodiments, and will be readily apparent to those skilled in the art having a knowledge of various electro-optic devices and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

The invention accordingly comprises the features of construction, combination of elements, and arrangement of components exemplified herein, as would be understood by those skilled in the art made aware of this invention.

BRIEF DESCRIPTION OF THE DRAWINGS

In the drawing figures, which are not to scale, and which are merely illustrative, and wherein like reference numerals depict like elements throughout the several views.

$\sigma_1, \alpha_1, W_1, T_1$ are the conductivity, absorption coefficient, width and thickness of layer metal contact 1; $n_2, \in_2, T_2$ are the refractive index, dielectric constant, and thickness of layer cladding 1; $n_3, \in_3, T_3, r_{33}$ are the refractive index, dielectric constant, thickness and EO coefficient of layer EO material; $n_4, \in_4, T_4$ are the refractive index, dielectric constant, and thickness of layer cladding 2; $\sigma_5, \alpha_5, T_5$ are the conductivity, absorption coefficient, and thickness of layer metal contact 2; and $n_6, \in_6, T_6$ are the refractive index, dielectric constant, and thickness of layer substrate.

Figure 1:
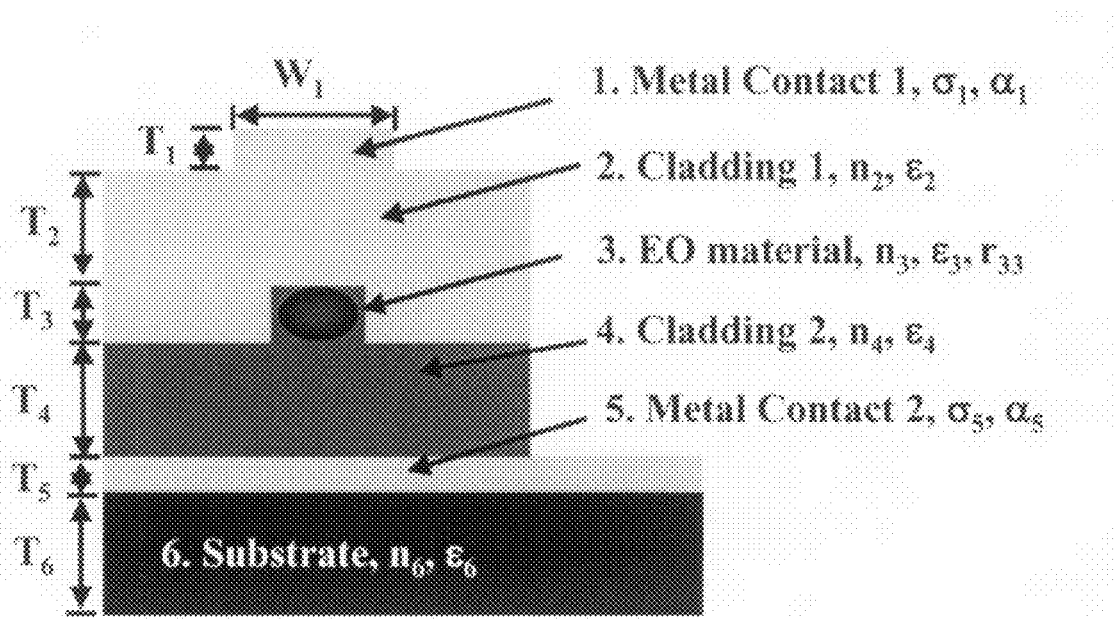
FIG. 1 is a schematic diagram illustrating a typical structure of conventional organic EO modulator of the prior art.
Figure 2:
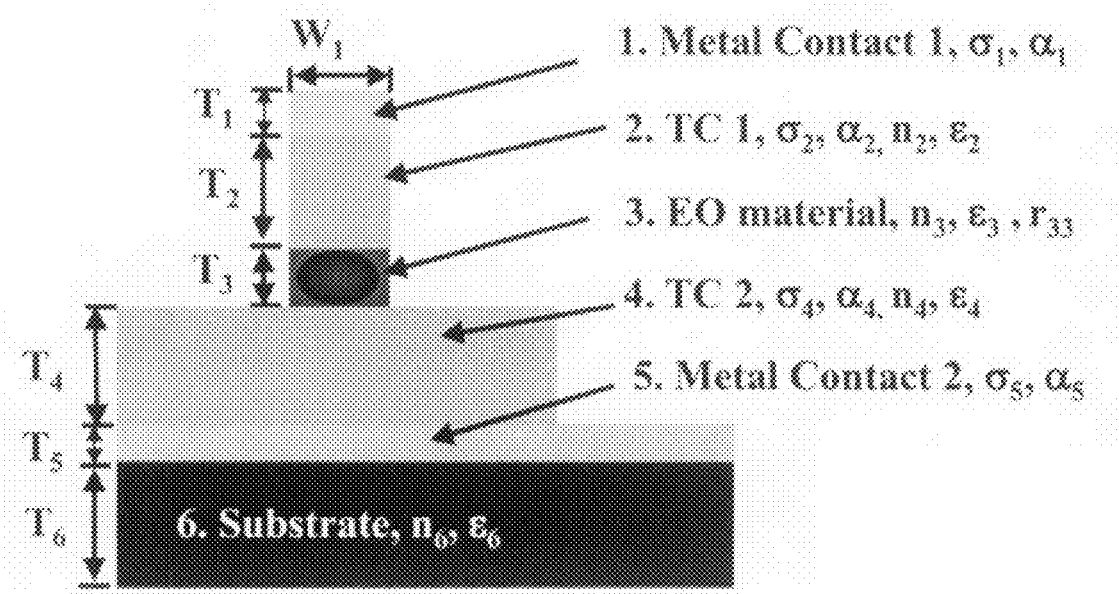

FIG. 2 is a schematic diagram of an EO modulator structure using a TC material as cladding, in accordance with this invention:

This design can have ~5-10× lower switching voltage than the conventional design shown in FIG. 1. $\sigma_1, \alpha_1, W_1, T_1$ are the conductivity, absorption coefficient, width and thickness of metal contact 1; $\sigma_2, \alpha_2, n_2, \in_2, T_2$ are the conductivity, absorption coefficient, refractive index, dielectric constant, and thickness of TC 1; $n_3, \in_3, T_3, r_{33}$ are the refractive index, dielectric constant, thickness and EO coefficient of EO material; $\sigma_4, \alpha_4, n_4, \in_4, T_4$ are the conductivity, absorption coefficient, refractive index, dielectric constant, and thickness of TC 2; $\sigma_5, \alpha_5, T_5$ are the conductivity, absorption coefficient, and thickness of metal contact 2; and $n_6, \in_6, T_6$ are the refractive index, dielectric constant, and thickness of substrate.

Figure 3A:
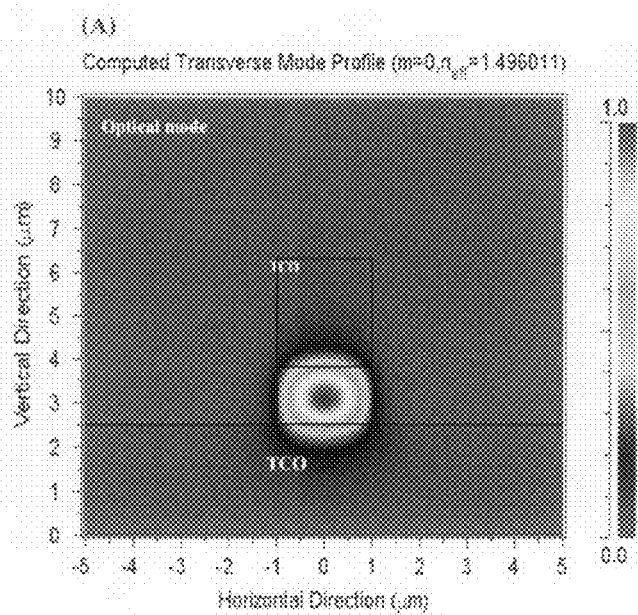
Figure 3B:
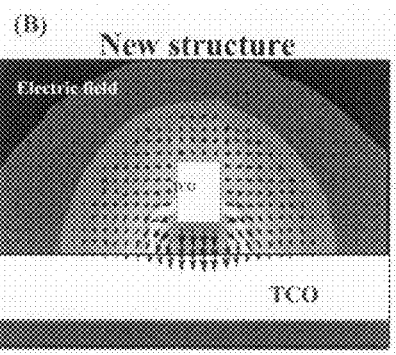
Figure 3C:
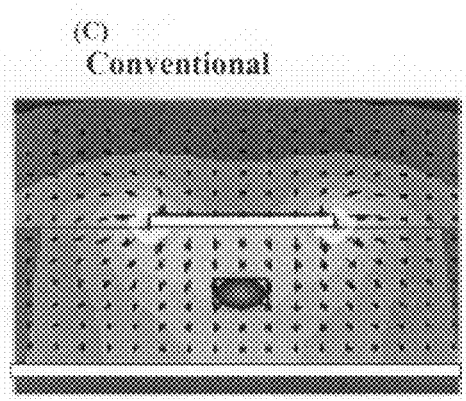

FIGS. 3A-C show: (A) optical mode of vertical-conduction modulator structures; (B) strong electric field of vertical-conduction modulator structures; and (C) conventional structure with much weaker electric field.

Figure 4:
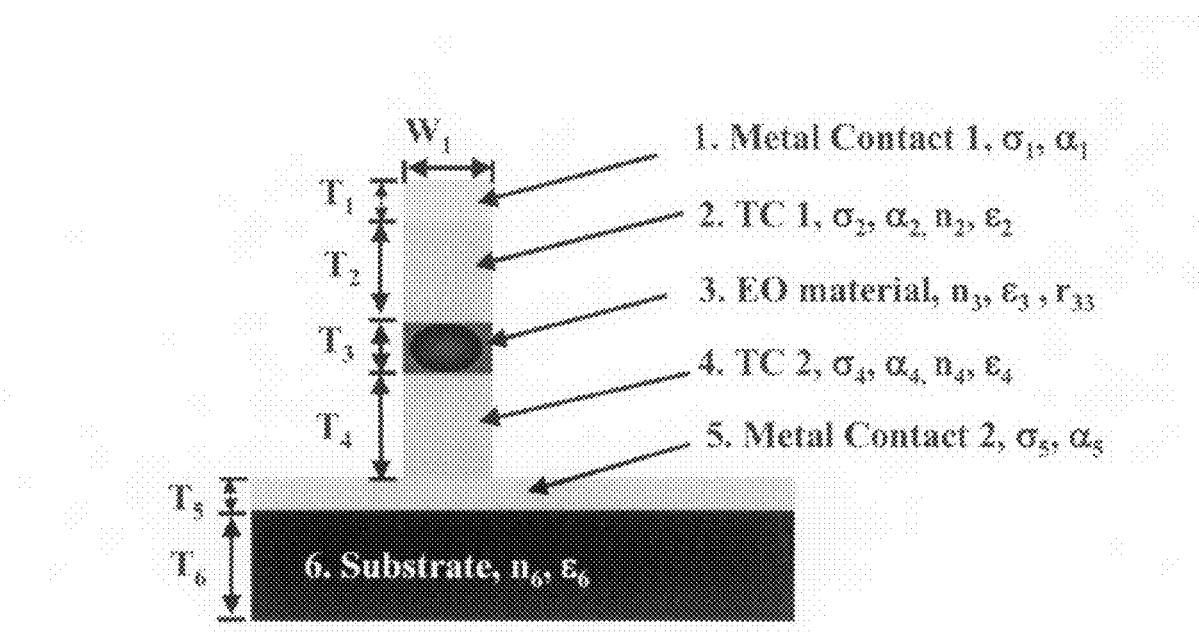

FIG. 4 is a schematic diagram of an EO modulator structure using vertical conduction, with etching to the bottom metal, in accordance with this invention:

$\sigma_1, \alpha_1, W_1, T_1$ are the conductivity, absorption coefficient, width and thickness of metal contact 1; $\sigma_2, \alpha_2, n_2, \in_2, T_2$ are the conductivity, absorption coefficient, refractive index, dielectric constant, and thickness of TCO 1; $n_3, \in_3, T_3, r_{33}$ are the refractive index, dielectric constant, thickness and EO coefficient of EO material; $\sigma_4, \alpha_4, n_4, \in_4, T_4$ are the conductivity, absorption coefficient, refractive index, dielectric constant, and thickness of TCO 2; $\sigma_5, \alpha_5, T_5$ are the conductivity, absorption coefficient, and thickness of metal contact 2; and $n_6, \in_6, T_6$ are the refractive index, dielectric constant, and thickness of substrate.

Figure 5:
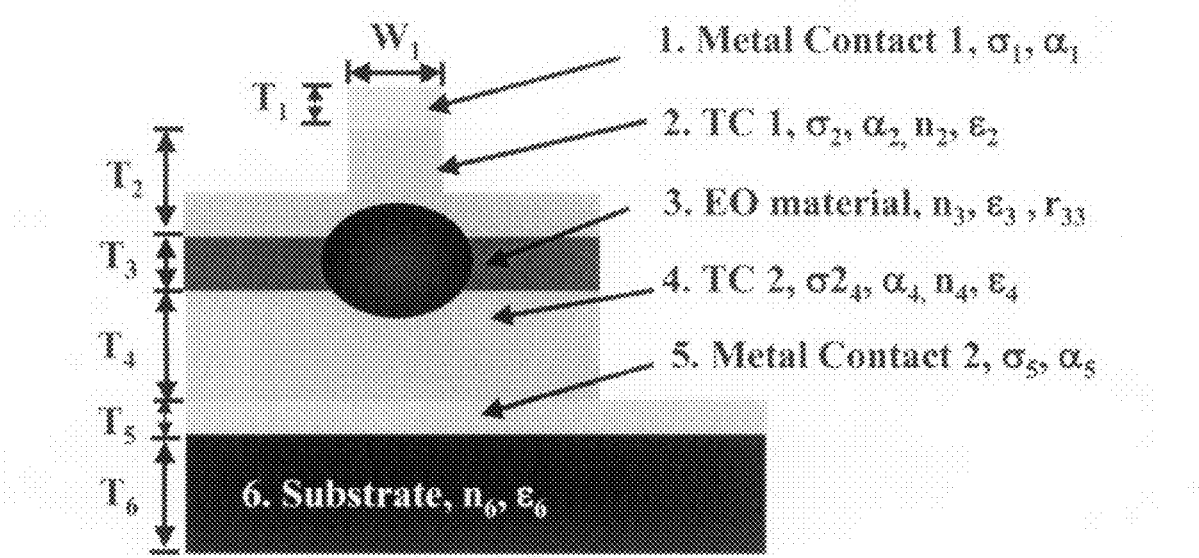

FIG. 5 is a schematic diagram of an EO modulator structure using vertical conduction, with partial etching to top TCO, in accordance with this invention:

$\sigma_1, \alpha_1, W_1, T_1$ are the conductivity, absorption coefficient, width and thickness of metal contact 1; $\sigma_2, \alpha_2, n_2, \in_2, T_2$ are the conductivity, absorption coefficient, refractive index, dielectric constant, and thickness of TCO 1; $n_3, \in_3, T_3, r_{33}$ are the refractive index, dielectric constant, thickness and EO coefficient of EO material; $\sigma_4, \alpha_4, n_4, \in_4, T_4$ are the conductivity, absorption coefficient, refractive index, dielectric constant, and thickness of TCO 2; $\sigma_5, \alpha_5, T_5$ are the conductivity, absorption coefficient, and thickness of metal contact 2; and $n_6, \epsilon_6, T_6$ are the refractive index, dielectric constant, and thickness of substrate.

Figure 6A:
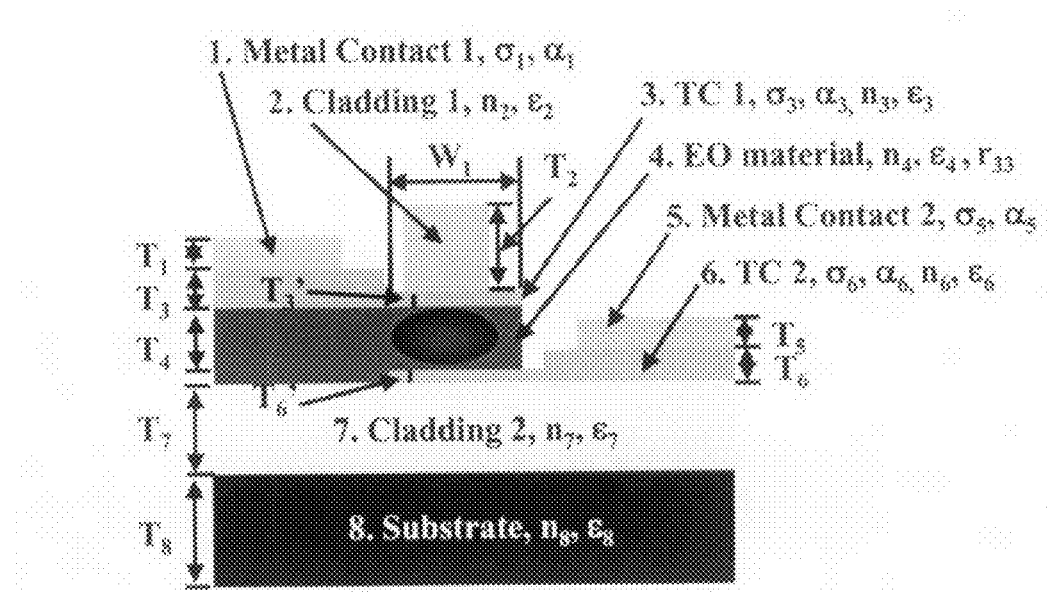

FIG. 6A is a schematic diagram of an EO modulator structure using a side-conduction design with a $1^{st}$/top electrode on the left and a $2^{nd}$/bottom electrode on the right, arranged in a geometry as to generate a vertical field at the EO material, in accordance with this invention:

$\sigma_1, \alpha_1, W_1, T_1$ are the conductivity, absorption coefficient, width and thickness of metal contact 1; $n_2, \epsilon_2, T_2$ are the conductivity, absorption coefficient, refractive index, dielectric constant, and thickness of Cladding 1; $\sigma_3, \alpha_3, n_3, \epsilon_3, T_3$ are the conductivity, absorption coefficient, refractive index, dielectric constant, and thickness of TCO 1; $n_3, \epsilon_3, T_3, r_{33}$ are the refractive index, dielectric constant, thickness and EO coefficient of EO material; $\sigma_5, \alpha_5, T_5$ are the conductivity, absorption coefficient, and thickness of metal contact 2; $\sigma_6, \alpha_6, n_6, \epsilon_6, T_6$ are the conductivity, absorption coefficient, refractive index, dielectric constant, and thickness of TCO 2; $n_7, \epsilon_7, T_7$ are the conductivity, absorption coefficient, refractive index, dielectric constant, and thickness of Cladding 2; $n_8, \epsilon_8, T_8$ are the refractive index, dielectric constant, and thickness of substrate.

Figure 6B:
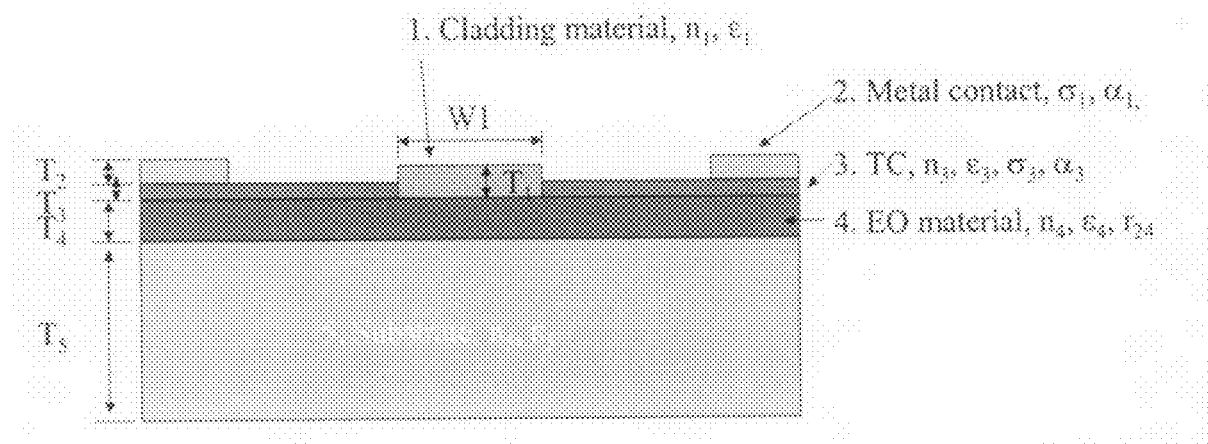

FIG. 6B is a schematic diagram of an EO modulator structure using a side-conduction design with a $1^{st}$/top electrode on the left and a $2^{nd}$/bottom electrode on the right, arranged in a geometry as to generate a horizontal field at the EO material in accordance with this invention:

$\sigma_1, \alpha_1, W_1, T_1$ are the conductivity, absorption coefficient, width and thickness of metal contact 1; $n_2, \epsilon_2, T_2$, are the conductivity, absorption coefficient, refractive index, dielectric constant, and thickness of Cladding 1; $\sigma_3, \alpha_3, n_3, \epsilon_3, T_3$ are the conductivity, absorption coefficient, refractive index, dielectric constant, and thickness of TCO 1; $n_3, \epsilon_3, T_3, r_{33}$ are the refractive index, dielectric constant, thickness and EO coefficient of EO material; $\sigma_5, \alpha_5, T_5$ are the conductivity, absorption coefficient, and thickness of metal contact 2; $\sigma_6, \alpha_6, n_6, \epsilon_6, T_6$ are the conductivity, absorption coefficient, refractive index, dielectric constant, and thickness of TCO 2; $n_7, \epsilon_7, T_7$ are the conductivity, absorption coefficient, refractive index, dielectric constant, and thickness of Cladding 2; $n_8, \epsilon_8, T_8$ are the refractive index, dielectric constant, and thickness of substrate.

Figure 7:
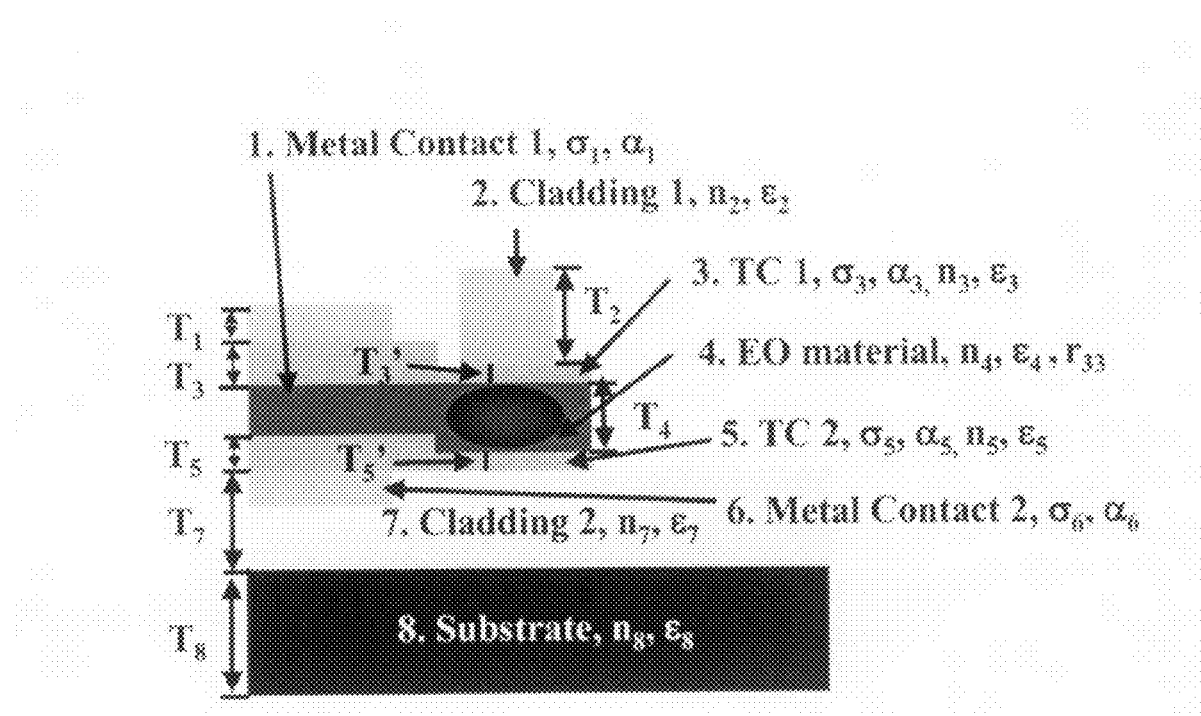

FIG. 7 is a schematic diagram of an EO modulator structure using a side-conduction design with a $1^{st}$/top electrode on the left and a $2^{nd}$/bottom electrode covering the bottom, in accordance with this invention:

$\sigma_1, \alpha_1, W_1, T_1$ are the conductivity, absorption coefficient, width and thickness of metal contact 1; $n_2, \epsilon_2, T_2$ are the conductivity, absorption coefficient, refractive index, dielectric constant, and thickness of Cladding 1; $\sigma_3, \alpha_3, n_3, \epsilon_3, T_3$ are the conductivity, absorption coefficient, refractive index, dielectric constant, and thickness of TCO 1; $n_4, \epsilon_4, T_4, r_{33}$ are the refractive index, dielectric constant, thickness and EO coefficient of EO material; $\sigma_5, \alpha_5, T_5$ are the conductivity, absorption coefficient, and thickness of metal contact 2; $\sigma_6, \alpha_6, n_6, \epsilon_6, T_6$ are the conductivity, absorption coefficient, refractive index, dielectric constant, and thickness of TCO 2; $n_7, \epsilon_7, T_7$ are the conductivity, absorption coefficient, refractive index, dielectric constant, and thickness of Cladding 2; and $n_8, \epsilon_8, T_8$ are the refractive index, dielectric constant, and thickness of substrate.

Figure 8:
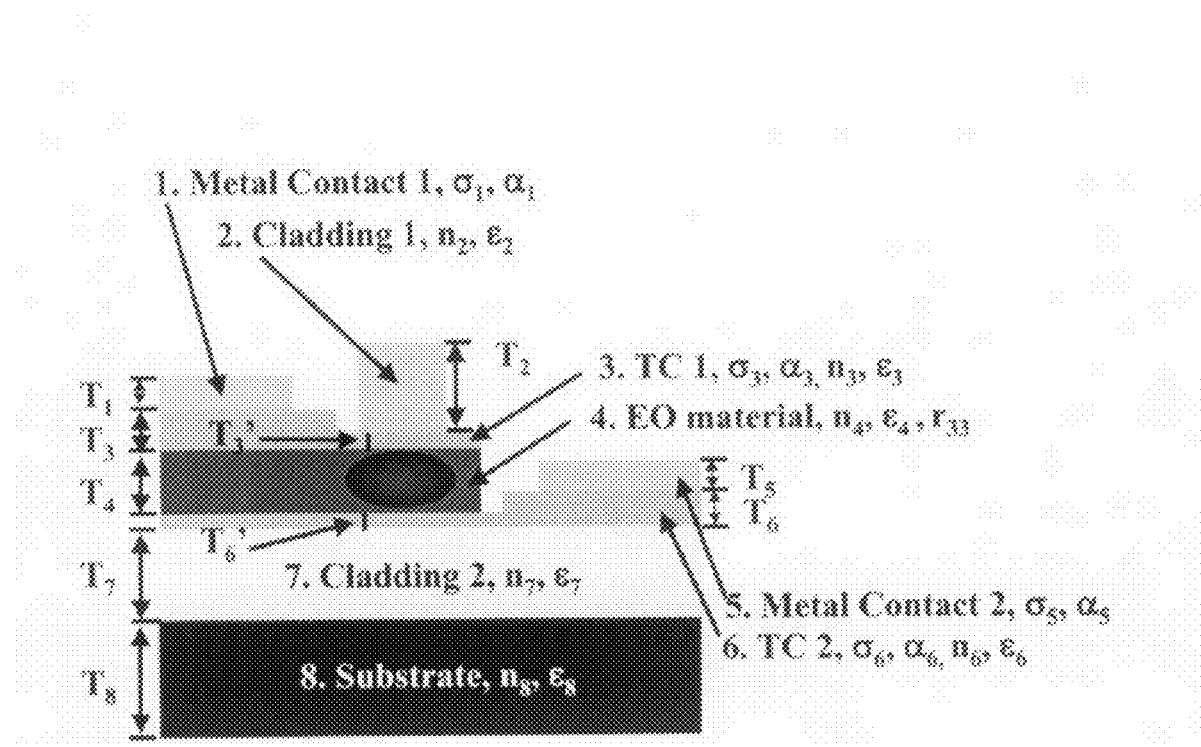

FIG. 8 is a schematic diagram of an EO modulator structure using a side-conduction design with a $1^{st}$/top electrode on the left and a $2^{nd}$/bottom electrode covering the bottom, in accordance with this invention:

$\sigma_1, \alpha_1, W_1, T_1$ are the conductivity, absorption coefficient, width and thickness of metal contact 1; $n_2, \epsilon_2, T_2$ are the conductivity, absorption coefficient, refractive index, dielectric constant, and thickness of Cladding 1; $\sigma_3, \alpha_3, n_3, \epsilon_3, T_3$ are the conductivity, absorption coefficient, refractive index, dielectric constant, and thickness of TCO 1; $n_4, \epsilon_4, T_4, r_{33}$ are the refractive index, dielectric constant, thickness and EO coefficient of EO material; $\sigma_5, \alpha_5, T_5$ are the conductivity, absorption coefficient, and thickness of metal contact 2; $\sigma_6, \alpha_6, n_6, \epsilon_6, T_6$ are the conductivity, absorption coefficient, refractive index, dielectric constant, and thickness of TCO 2; $n_7, \epsilon_7, T_7$ are the conductivity, absorption coefficient, refractive index, dielectric constant, and thickness of Cladding 2; and $n_8, \epsilon_8, T_8$ are the refractive index, dielectric constant, and thickness of substrate.

Figure 9A:
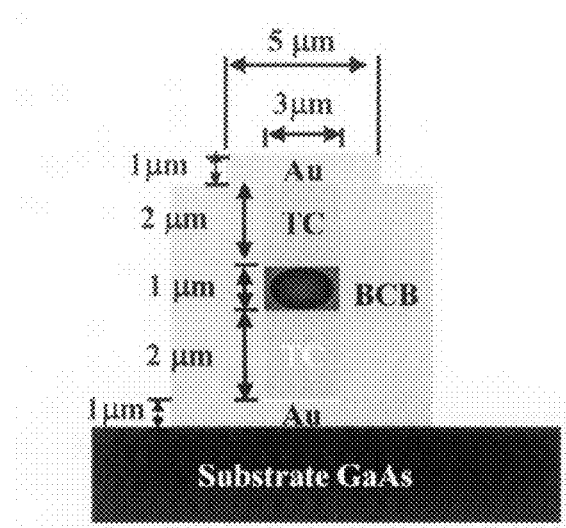

FIGS. 9A and B: (A) illustrates an example of an impedance matching device structure, with non-limiting dimensions provided only for purpose of illustration; and BCB represents B-stage bisbenzocyclobutene; and (B) shows impedance matching simulation results.

Figure 10:
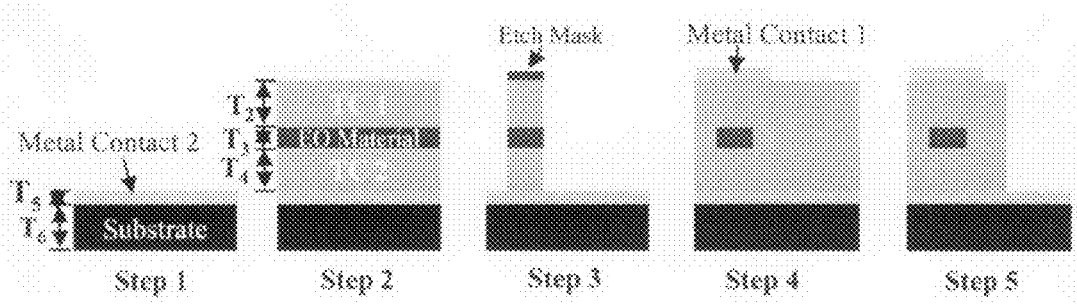

FIG. 10 illustrates schematically an example of a fabrication process used in conjunction with an exemplary modulator structure of this invention.

FIG. 11. Structures of TC modulators with (a) vertical and (b) side conduction configuration, are shown further electrically conducted to two metal electrodes that form RF traveling-wave electrodes for higher frequency of operation.

Figure 12:
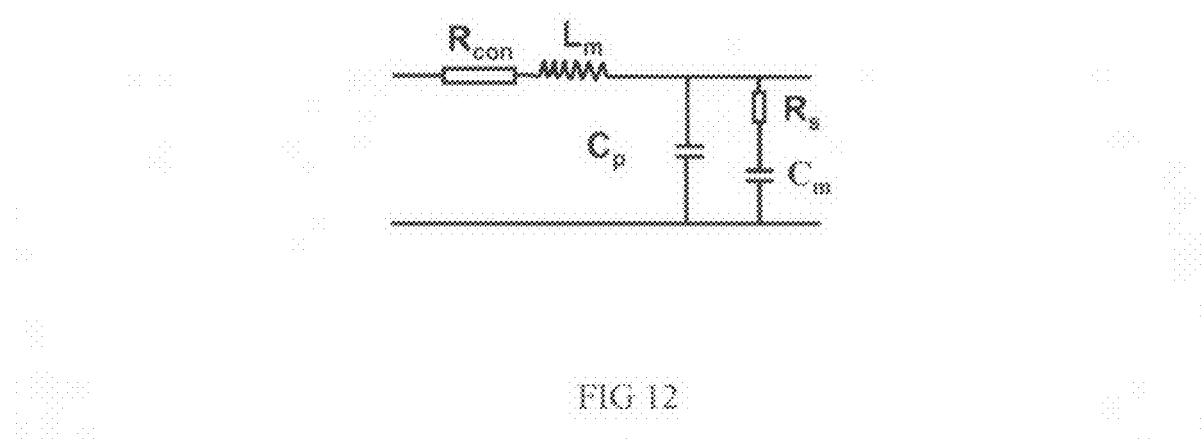

FIG. 12. A diagram of an equivalent circuit for a traveling-wave EO modulator, in accordance with this invention.

Figure 13A:
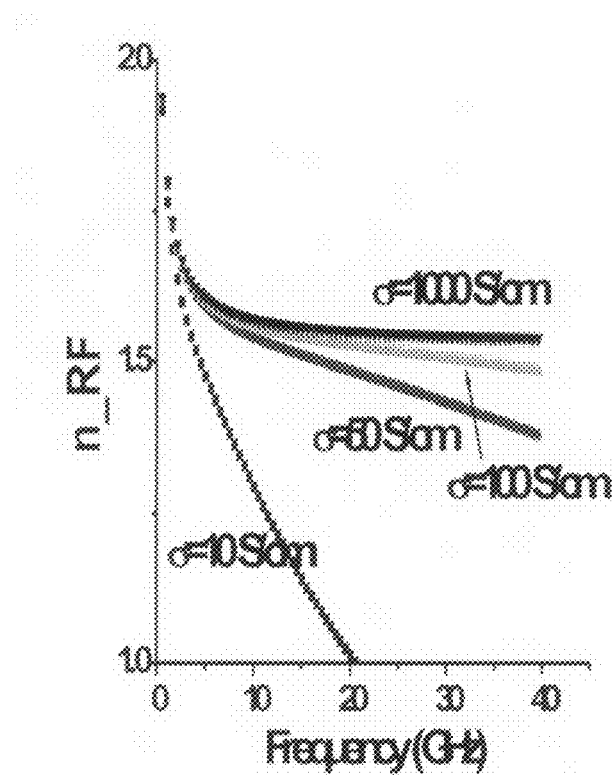
Figure 13B:
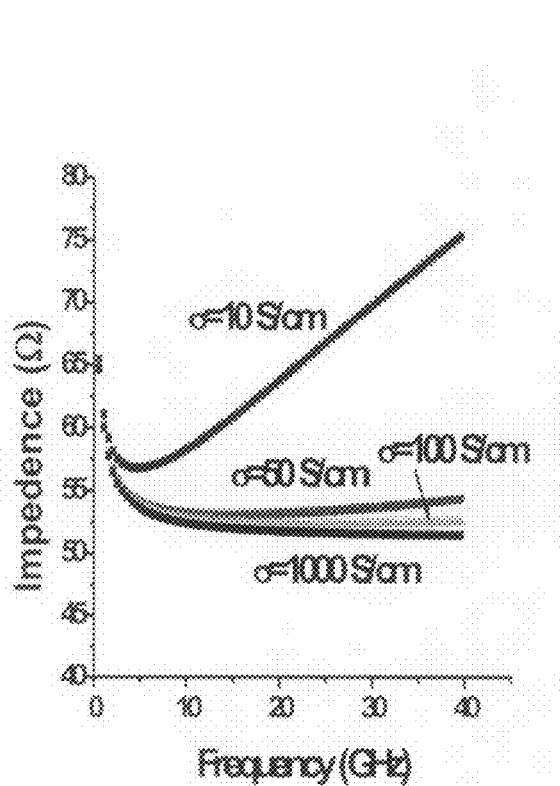
Figure 13C:
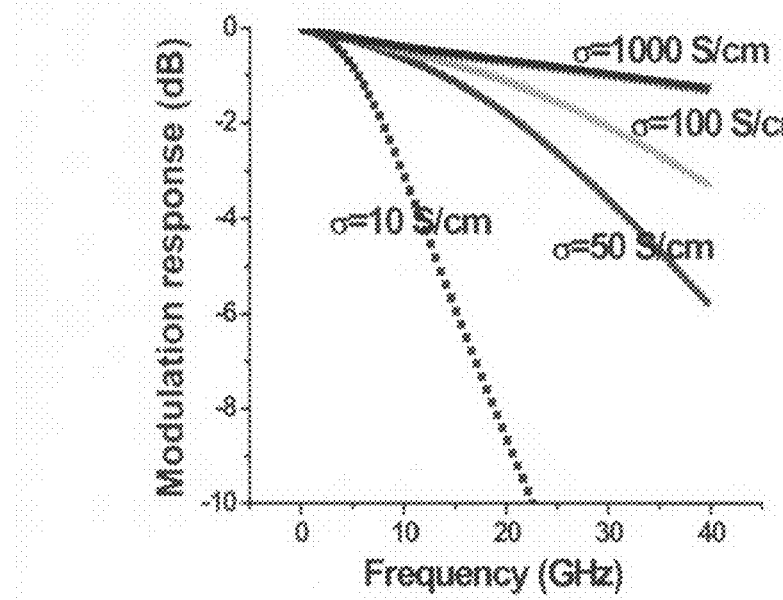

FIG. 13. Graphic representations showing dependence of (A) RF speed, (B) modulator impendence and (C) modulation bandwidth on conductivity of TCO.

Figure 14:
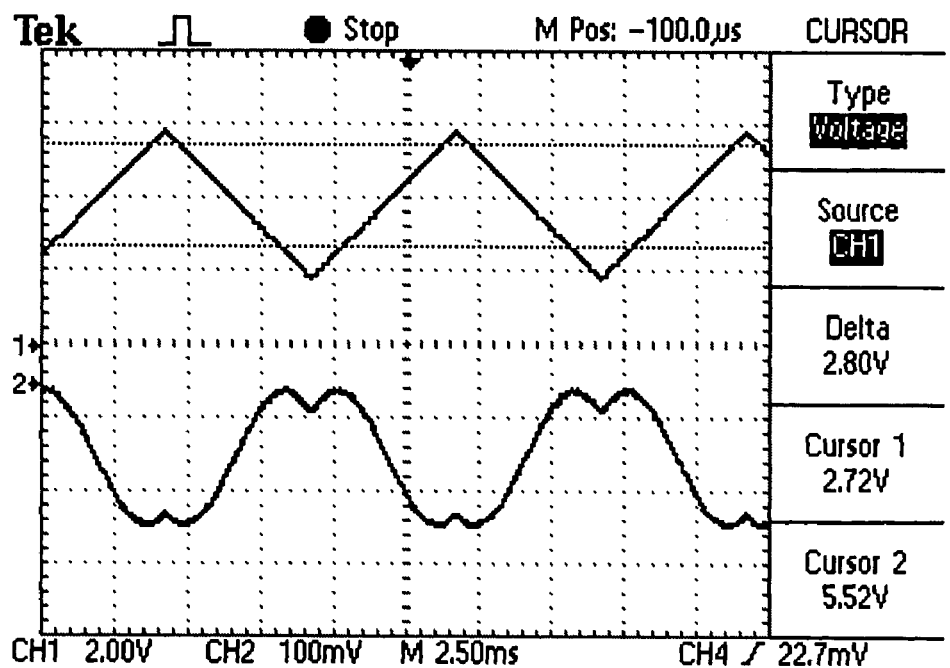

FIG. 14. A graphic representation of the modulation response of a TCO modulator. Trace 1 is the applied voltage signal. Trace 2 is the optical intensity signal at the output of the modulator.

Figure 15:
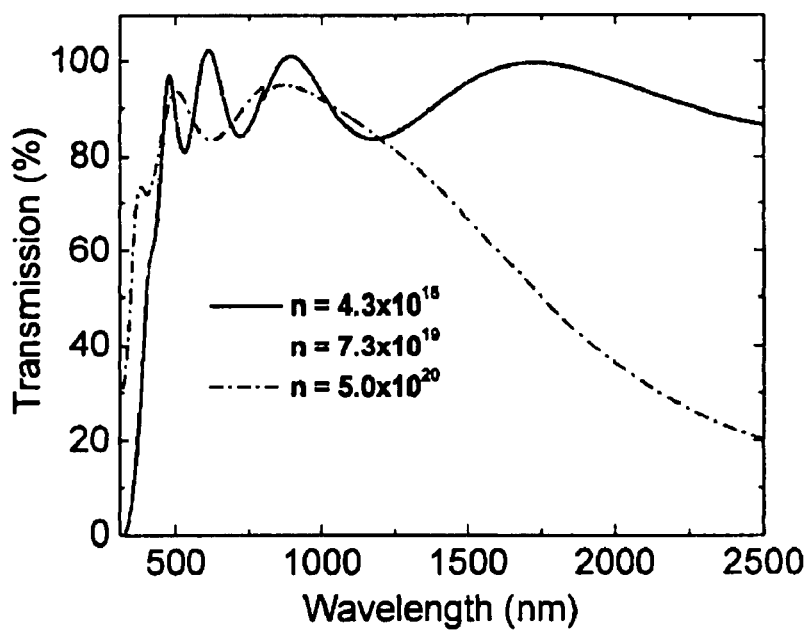

FIG. 15. A representation of dependence of transmission and carrier concentration of $In_2O_3$ film deposited by IAD on glass.

DETAILED DESCRIPTION OF THE PREFERRED EMBODIMENTS

For purposes of comparison, a prior art organic EO modulator is shown in FIG. 1. The waveguide core layer can be EO polymer, such as poled polymer or self-assembled superlattice thin film, or another EO material of the sort discussed herein. The core layer thickness is typically 1-3 μm. The top and lower waveguide cladding layers are non-EO polymer, which are typically ~3-4 μm thick. The refractive index of the waveguide core layer is higher than that of the cladding layers in order to achieve waveguiding in the vertical direction. In the lateral direction, waveguiding is formed by a ridge structure (formed by etching down only part of the top cladding layer thickness) or a channel waveguide structure (formed by etching down to the core part. The top and lower cladding are not only for waveguiding, but also provide buffer layers between the metal and waveguiding layer to reduce metal optical loss. A thick cladding layer will increase the operating voltage due to the decrease in the electrical field strength across the active EO layer, which is proportional to the applied voltage and inversely proportional to the distance between the electrodes. The net result is a reduced effective voltage across the EO material and a necessarily high switching voltage for the modulator. Construction of a prior art device is summarized, below, in Table 1.

TABLE 1

Layer structure of a conventional EO modulator

| Layers | Material | Thickness (μm) |
|---|---|---|
| Top electrode | Metal | — |
| Top cladding | UV - curable polymer | 2.9 |
| EO material | CLD-1/PMMA | 1.4 |
| Bottom cladding | polyurethane | 3.2 |
| Bottom electrode | Metal | — |

In contrast, a TC component, in accordance with this invention, will create an electrical field that is directly applied to the active waveguiding core layer and hence reduce the required operating voltage. The use of transparent conducting films directly in contact with EO material can be used to impose a strong electric field across the EO active layer. One embodiment, as shown in FIG. 2, illustrates an exemplary waveguide plus TC electrode structure. Compared to conventional EO modulator structure with normal cladding and metal electrodes as shown in FIG. 1, this novel EO modulator structure with TC cladding substantially increases the imposed electric field, and provides a stronger electric field across the EO active layer. (See, also, example 5 for further prior art comparisons.)

With reference to FIGS. 2-9, two main parameters should be considered for this type of EO modulator. One is Vπ, the applied voltage to induce a π phase shift, (Eq. 1). Generally, in light of this invention, The smaller Vπ the better. Another is the modulation bandwidth, f the frequency response of the device given by Eq. 2, but not applicable for traveling waves. The bandwidth, optimally, should be as great as possible.

$$V_\pi = \frac{\lambda G}{2n^3 \Gamma r_{33} L} \quad (1)$$

$$f = \frac{1}{2\pi RC} \quad (2)$$

Here, λ is the operating wavelength, G is the gap between hot electrode and ground electrode, n is the refractive index of the waveguiding material, Γ is the percentage of overlap between the optical field and the electric field, $r_{33}$ is the EO coefficient of the active material, L is the waveguide length that exhibits the EO effect, R is the resistance of the device, and C is the capacitance of the device. Using a TC material to replace top and bottom cladding, G (gap between hot electrode and ground electrode) can be 5-10× smaller, which means a lower Vπ. The device modulation bandwidth can also be much larger because the conductivity of the TCO is also large (very small resistance, R). For a modulator based on an EO material, performance is directly related to the waveguide optical properties and dimensions, electrode configuration (thickness, separation, length), and the cladding material properties and thickness. Due to the complex interdependencies, detailed analyses are needed to define those parameters that simultaneously provide a high bandwidth-to-voltage ratio and impedance near 50Ω.

From Eq. (1), a lower switching voltage can be achieved by either reducing the effective distance between electrodes, increasing the EO coefficient, or increasing the device length. For a given EO material, the device length and electrode distance are the only parameters that can be optimized to achieve low switching voltage. However, there are physical limits. For example, the device length is limited by the intrinsic optical propagation loss of the modulator waveguide. The modulator electrode distance is also thought to be limited and cannot be arbitrary small because of the high optical absorption loss that will occur when the optical wave touch the metal electrodes. An EO modulator of the prior art has cladding layers with a certain minimal thickness to avoid the lightwave touching the top and bottom metal electrodes. The voltage drop across the cladding layers will decrease the actual voltage applied to the active EO layer.

As shown herein, this problem can be alleviated and the effective electrode distance can be made much smaller with the use of optically transparent but electrically conductive materials or transparent conducting materials as cladding materials, resulting in substantial reduction in the modulator switching voltage. Furthermore, a reasonably high modulation speed (e.g., >20 GHz) can be achieved with appropriately engineered transparent conducting materials. As discussed above, one class of transparent conducting, materials that can achieve the required properties is the transparent conducting oxides (TCOs). Compared with conventional metal electrodes, TCO electrodes have the advantages of low optical loss and adjustable conductivity. In such new structures, a nonlinear EO material—whether poled or acentric and whether based on organic or inorganic materials—can be directly sandwiched between conductive TCO electrodes without a voltage drop on the top and bottom cladding, which greatly increases the electric field applied to the nonlinear EO materials. As a result, the switching voltage can be reduced substantially. Even so, the side conduction geometries of this invention can tolerate a substantially higher TCO loss coefficient α and a higher refractive index. As demonstrated below, such developments can be used to enhance the benefits available through use of the TC/TCO materials.

To meet the requirements for use in a polymer modulator, a TC film should be transparent and have acceptably low propagation losses at working wavelength (such as about 1.55 μm). The properties of TC (and TCO) materials are determined by their optical transparencies and electrical conductivities. A commonly known TCO is Indium Tin Oxide (ITO) having electrical conductivities of $2.5 \sim 5 \times 10^3$ $\Omega^{-1}\text{cm}^{-1}$, which is more than adequate for most modulator applications (see below), but the absorption at 1.55 μm is unacceptably high for some but not all applications. Various known TCOs, including doped ITOs can be prepared, as would be understood in the art, to meet the TC materials requirements for the modulator structures of this invention, as shown below. Other non-oxide TCs can also meet the general structural and materials considerations of the present invention. The materials and structural specifications here are thus not restricted to any specific TCO materials, used or inferred herein, and are generally applicable to other TC materials as is known to those skilled in the art.

As shown in FIG. 2, top and bottom TC layers provide both optical cladding and electric conducting function. With such a structure, the TC can, optimally, have a lower refractive index than the core polymer layer.

In certain embodiments, the thickness of core layer $T_3$ is less than $\lambda/2(n_{core}^2 - n_{clad}^2)^{1/2}$ in order to achieve a single mode waveguide. λ is the working wavelength. The factor $\lambda/2(n_{core}^2 - n_{clad}^2)^{1/2}$ often appears in waveguide calculation as the characteristic length $Lc = \lambda/2(n_{core}^2 - n_{clad}^2)^{1/2}$. Consider λ=1500 nm for numerical example. $n_{core}$ is refractive index of waveguide core. $n_{clad}$ is refractive index of cladding, $n_{clad}$ can be $n_2$ or $n_4$. For a certain EO material with certain $r_{33}$, with a target Vπ, the waveguide length L can be calculated from Eq (1).

With this thickness of core layer $T_3$, the capacitance can be estimated via $C=\epsilon_3\epsilon_0 W_1 L/T_3$, where $\epsilon_3$ is the dielectric constant of EO material, $\epsilon_0$ is dielectric constant in vacuum (which is 8.85 pF/m), $W_1$ is waveguide width, and L is waveguide length. With this capacitance and a target bandwidth, then the R required of a TC electrode can be calculated by Eq (2).

The minimum thickness $T_2$, $T_4$ of the TC layer is determined by metal loss from top & bottom metal. For a given waveguide length L, $\alpha(metal) \times L < 0.5$. $T_2$, $T_4$ should typically be $> Lc = \lambda/(n_{core}^2 - n_{clad}^2)^{1/2}$ because the field in the cladding for a single-mode waveguide typically decays approximately as $E \sim Exp(-y/Lc)$, where y is the distance from the core-cladding interface. Hence, the amount of energy at the metal will decay to $En \sim E^2 \sim Exp(-2y/Lc)$. For a given L, $\alpha(metal) L \sim (L/\lambda) \times (1-En)$. Requiring $\alpha(metal) L < 0.5$ then gives $(L/\lambda) \times (1-En) < 0.5$, which can be used to determine y, and y will then give the required thickness for $T_2$ or $T_4$ (i.e. $T_2$ or $T_4 > y$). Where, in a worse case, the modulator is one wavelength long, $L \sim \lambda$, then approximately $T_2$ or $T_4 > Lc$. For modulators that have $L \sim 1000\lambda$, $T_2$ or $T_4$ are typically 3× to 4×Lc (exponential decay factor gives about (1/1000) lower energy at the metal when $T_2$ or $T_4$ are 3×Lc compared to when $T_2$ or $T_4$ are Lc). With required resistance R and thickness of $T_2$, $T_4$, the required TC electric conductivity $\sigma$ can be deduced by resistance $R = (T_2 + T_4)/(\sigma W_3 L)$. The resistance R is related to the required frequency response bandwidth given by the relationship $1/(RC)$. If the waveguide length L is known by targeting $V\pi$, then the required TC absorption coefficient $\alpha$ can be determined by setting $\alpha L \Gamma_{tc} < 1$ dB, where $\Gamma_{tc}$ is the overlapping factor of TC over the optical mode. For a certain EO material with certain $r_{33}$, with a target $V\pi$ and bandwidth, the electric conductivity $\sigma$ and absorption coefficient $\alpha$, or ratio thereof $\sigma/\alpha$, can be determined for a particular TC cladding material.

Accordingly, as the electro-optic coefficient for an EO material is known or can be readily ascertained, given the mathematical and functional relationships described above, a TC/TCO component material can be chosen having the conductivity and absorption coefficients providing the applied voltage and bandwidth parameters desired for modulator performance. Such properties and physical characteristics of transparent conducting and transparent conducting oxide materials are known in the art or can be readily determined using known experimental techniques. For instance, various TCO materials of the type useful in context of the present invention (e.g., various ZITO and GITO materials) can be prepared, isolated and/or characterized, then utilized, as described in co-pending application Ser. No. 10/228,521 filed Aug. 27, 2002, together with the technical publications cited therein, such application incorporated herein by reference in its entirety. Conversely, given the conductivity and absorption coefficients for a known TC/TCO cladding/electrode material, a modulator device of the type described herein can be designed and constructed, in conjunction with a particular EO material, to target a desired applied voltage and/or bandwidth. Regardless of a particular EO material, modulator design and component configuration, using TC/TCO materials of the sort described or incorporated herein, will be understood by those skilled in the art made aware of this invention.

EXAMPLES OF THE INVENTION

The following non-limiting examples and data illustrate various aspects and features relating to the modulator devices and components of the present invention, including the assembly of device structures comprising TC/TCO components as described herein. In comparison with the prior art, the present devices and component structures provide results and data which are surprising, unexpected and contrary thereto. While the utility of this invention is illustrated through the use of several TC/TCO materials/components/layers which can be used therewith, it will be understood by those skilled in the art that comparable results are obtainable with various TC/TCO materials/components/layers, consistent with the mathematical and functional relationships described herein, as are commensurate with the scope of this invention and as would be understood by those skilled in the art having an awareness thereof.

As is well known to those skilled in the art, there are a large number of structures in which a channel optical waveguide can be formed. While the utility of this invention is illustrated through the use of a few exemplary waveguiding structure or single-mode nature waveguiding embodiments they are not meant to restrict the scope of the invention. Any such waveguide can be of a variety of waveguiding structures, single mode or multi mode, with strong or weak optical mode confinement, known to those skilled in the art, providing it guides optical beam energy from one location to another location. As is well known to those skilled in the art, an electro-optic material can form part of or the entire waveguide core or cladding layers or both the core and cladding layers, providing the optical beam energy is finite in the electro-optic material and providing the applied electric field from the TC components reaches the electro-optic material.

Example 1

For a device structure of such embodiments, the waveguide core layer can be any EO material, such as a poled polymer, self-assembled polymer, $LiNbO_3$, $BaTiO_3$, a semiconductor (e.g., GaAs, AlAs, AlGaAs, InP, InGaAs, InGaAsP) or others. PEPCOOH (e.g., a self-assembled polymer; that is, Pyridine-Ethene-Pyrrole-Carboxylic Acid) is used as an example (refractive index n=1.9 at 1.55 μm wavelength). The TC cladding can be any known TC or TCO, such as but not limited to the polymeric materials described herein, as well as ZnO, ZIO, GIO, GITO, ZITO, ITO, CdO or others. Here, ZITO can be used for purpose of example (refractive index n=1.7 at 1.55 μm wavelength). For a device structure, the ridge etching can stop anywhere from the top TCO to the bottom metal, which will give a different mode size of waveguide, single mode or multi mode. Three examples are presented: a 1st example with etching to the bottom TCO after the EO material, a 2nd example with etching to the bottom metal, and a 3rd example with partial etching half way through the top TCO, as described below.

Example 1a

1st Example with Etching to Bottom of TCO after EO Material

With reference to the device structure shown in FIG. 2, a TCO thickness is 2 μm (e.g., thick enough to reduce metal loss $\alpha L < 0.3$ d) and core layer is 1 μm; waveguide width is 2 μm. As shown in FIG. 3, simulation results clearly show good optical confinement and much stronger electric field (FIG. 3B) cross the EO material compared to a conventional structure (FIG. 3C).

A planar structure as the bottom TCO instead of a ridge structure will give a smaller resistance due to the larger area, ~2× different (R top=2.19R bottom for this example). The top and bottom TCO can be single layer or multi-layer with the same or different electric conductivity.

To illustrate a single layer TC electrode, a waveguide core layer is PEPCOOH with an EO coefficient $r_{33}$=120 pm/V and a refractive index n=1.9. The cladding layer is ZITO with a refractive index n=1.7. With three refractive indices, the core thickness and cladding thickness can be determined as shown in the previous discussion: core thickness here is 1 μm and cladding thickness is 2 μm. For a target Vπ=0.5V, the waveguiding sample length is 0.25 cm by using Eq (1). (With a conventional structure, $V_\pi$ will be 2.5-5 V because a thicker non-conductive cladding creates an electrode gap 5-10 times wider.) Depending on desired frequency response, with a 0.25 cm sample length, the absorption coefficient α of ZITO in order to keep $\alpha L\Gamma_{tc}$<1 dB ($\Gamma_{tc}$=0.2 for this device structure)), should be about 4.5 cm$^{-1}$.

For a fixed device structure, the electric conductivity of ZITO can be deduced from the target bandwidth by using Eq (2), with consideration of the capacitance and resistance relationships discussed above. If a target bandwidth is 20 GHz, the electric conductivity of ZITO is 0.2 s/cm. Different target bandwidths require different TCO electric conductivity. Table 2 shows a summary of optimal TCO parameters at different frequency responses targeting $V_\pi$=0.5V. for up to a frequency of 100 GHz with high $r_{33}$~120 pm/V and targeting $V_\pi$=5V for the still high-frequency of 1 GHz with low $r_{33}$~12 pm/V. In general, to achieve a reasonably high frequency of >about 1.0 GHz with any EO material's $r_{33}$ (whether low or high), the TC's conductivity should be >about 0.01 S/cm and optical absorption loss should be <about 4.5 cm$^{-1}$ or the conductivity to loss ratio should be >about 0.002 S.

Summary of TCO parameters at different frequency responses (20 GHz, 40 GHz, 100 GHz), targeting $V_\pi$=0.5V or 5V with $r_{33}$=120 pm/V or 12 pm/V.

TABLE 2

| | Target Bandwidth | | | |
| --- | --- | --- | --- | --- |
| | 1 GHz (5 V) $r_{33}$ = 12 pm/V | 20 GHz (0.5 V) $r_{33}$ = 120 pm/V | 40 GHz (0.5 V) $r_{33}$ = 120 pm/V | 100 GHz (0.5 V) $r_{33}$ = 120 pm/V |
| Conductivity σ (s/cm) | >0.01 | >0.2 | >0.4 | >1 |
| Absorption α (cm$^{-1}$) | <4.5 | <4.5 | <4.5 | <4.5 |

With current ZITO parameters of: absorption α~900 cm$^{-1}$, the conductivity σ~2000 S/cm. If TCO absorption can be reduced from 900 cm$^{-1}$ to 4.5 cm$^{-1}$, conductivity will be 10 S/cm, which is enough for the requirement for 100 GHz operation, with $V_\pi$=0.5V if only the RC limit is considered.

With a vertical-conduction structure, another advantage is that multilayer TC electrodes can be used. The layers close to the core can have a lower conductivity and lower absorption, while the layers close to metal can have larger conductivity and larger absorption. For a multilayer structure, the layers can be any type of TC with any conductivity and thickness. Optical loss is low and frequency response is high.

Consider the simplest case of a double-layer TC electrode: a 1st layer is 0.6 μm ZITO (n=1.7), and a 2nd layer is 1.4 μm ZITO (n=1.7). The core layer is PEPCOOH with $r_{33}$=120 pm/V, n=1.9. Based on a calculation analogous for a single TC electrode, a waveguide length=0.25 cm, for a target $V_\pi$=0.5V, which can be used to deduce absorption and conductivity requirements for the TC electrode. The only difference is that the layer close to core can have a lower conductivity and lower absorption, while the layer close to metal can have larger conductivity and larger absorption. Table 3 shows a summary of TC parameters at different frequency responses for a target $V_\pi$=0.5V with a double layer TC structure.

Summary of TC parameters at different frequency responses targeting $V_\pi$=0.5V or 5V (similar to Table 2) but with a double layer TC structure.

TABLE 3

| | | Targeting Bandwidth | | |
| --- | --- | --- | --- | --- |
| | | 1 GHz | 40 GHz | 100 GHz |
| 1st Layer TCO | σ (S/cm) | >0.06 | >0.12 | >0.3 |
| 0.6 μm thickness | α (cm$^{-1}$) | <3 | <3 | <3 |
| 2nd layer TCO | σ (S/cm) | >0.03 | >1.2 | >3.0 |
| 1.4 μm thickness | α (cm$^{-1}$) | <30 | <30 | <30 |

For certain applications, if the ZITO absorption can be reduced from 900 cm$^{-1}$ to 3 cm$^{-1}$, the conductivity can be 6.7 S/cm, enough for 100 GHz operation with $V_\pi$=0.5V if only RC limit is considered.

As shown in the modeling results above, use of transparent conducting oxide cladding layers can reduce the driving voltage of an EO modulator by a factor of ~5-10×.

Example 1b

2nd Example with Etching to Bottom Metal after TCO

Another device structure is shown in FIG. 4. With this structure, optical confinement is stronger than that available using the structure of Example 1a. The waveguide can be narrower for nano-scale application. TC parameter calculations for a target $V_\pi$ and frequency responses are based on the principles discussed in Example 1a.

Example 1c

3rd Example with Partial Etching to Top TCO

Another device structure is shown in FIG. 5. With this structure, optical confinement is weaker, as compared to the structures of Examples 1a and 1b. Mode size of a waveguide can be larger, for better fiber coupling. Also, shallow etching eases fabrication. TC parameter calculations for a target $V_\pi$ and frequency responses are as discussed above.

Example 2

Modulator with Current-Flow-From-Side Structure

Another embodiment of this invention provides side electrical conduction. With this device structure, a polymer core layer can have lower refractive index than a TC/TCO component. An additional cladding layer with lower refractive index on both top and bottom provides waveguiding in a vertical direction (FIG. 6). Lateral guiding is formed by a ridge structure on the top cladding. A very thin layer TC with a higher refractive index will not impact guiding by the waveguide core.

For this structure, the waveguide core layer can be any EO material, such as a poled polymer, self-assembled polymer, LiNbO$_3$, BaTiO$_3$, semiconductor (e.g., GaAs, AlAs, AlGaAs, InP, InGaAs, InGaAsP) or others. Here a self-assembled superlattice (SAS), as described above, was used as an example (refractive index n=1.6). Cladding can be of any known TC or TCO material, such as but not limited to ZnO, ZIO, GIO, GITO, ZITO, ITO, CdO or others. Here, ZITO was used as an example (refractive index n=1.7). Additional top and lower cladding can be any material with a lower refractive index: for instance, Cytop (n=1.34) as described above, can be used for a top cladding with $SiO_2$ (n=1.46) for a lower cladding. (See, e.g., the incorporated '685 patent.)

For such a device structure, the top and bottom electrode can be any shape or any configuration. Three examples are presented: a 1st example with a 1st/top electrode on the left and a 2nd/bottom electrode on right, a 2nd example with a 1st/top electrode on left and a 2nd/bottom electrode on left, and a 3rd example with a 1 st/top electrode on the left and a 2nd/bottom electrode covering the whole bottom.

The TC conductivity and absorption parameter calculations are much the same as with current-flow-from-top. Capacitance can be calculated using commercially-available Finite element method software known in the art. Core layer thickness and other waveguide dimension can be obtained using available mode solver or finite element method software, also known in the art and commercially available.

The thickness of core layer $T_4$ is, optimally, less than approximately $Lc=\lambda/2(n_{core}^2-n_{clad}^2)^{1/2}$ in order to keep single mode waveguiding. (Mode solver software can provide an accurate waveguide dimension, accounting for a complex TC multilayer structure.) $\lambda$ is the working wavelength and can be from about 200 nm to about 1700 nm. 1500 nm can be used as an example. $n_{core}$ is refractive index of waveguide core. $n_{clad}$ is refractive index of cladding.

For a certain given TC/TCO material with certain $r_{33}$, if a target $V_\pi$ is known, then the waveguide length L can be determined from Eq (1). With this thickness $T_4$, the capacitance can be estimated by $C=\epsilon_3\epsilon_0 W_1 L/T_3$ (or more accurate result by finite element method). $\epsilon_4$ is the dielectric constant of EO material. $\epsilon_0$ is dielectric constant in vacuum, which is 8.85 pF/m. $W_1$ is overlapping width of the 2 TC electrodes. $L_4$ is waveguide length. More accurate capacitance can be calculated by Finite element method. With this capacitance and a target bandwidth, then the required R of a TC electrode can be calculated by Eq (4).

The thickness $T_2$, $T_7$ of the cladding layer should be thick enough so that substrate loss will be low. But thickness is not as critical as with a top-bottom structure because of less effect on the capacitance value. If the waveguide length L is known for a certain target $V_\pi$, then the required TC absorption coefficient $\alpha$ can be determined by setting $\alpha L\Gamma_{tc}<0.3$ dB. $\Gamma_{tc}$ is overlapping factor of TC over optical mode, that can be obtained from any type of mode solver software known in the art. As discussed above, for a given EO polymer with certain $r_{33}$, for a target $V_\pi$ and bandwidth, the electric conductivity $\sigma$ and absorption coefficient $\alpha$ for a useful TC cladding material can be ascertained.

Example 2a

Example 1 with a 1 st/Top Electrode on the Left and a 2nd/Bottom Electrode on Right The metal electrodes (Au as an example) are placed on the side instead of the top of the TC to reduce metal loss (FIGS. 6A and 6B). A metal electrode is placed on the top left. Two cases are illustrated: (a) A second metal electrode is placed on the bottom right as illustrated in FIG. 6A; (b) A second metal electrode is placed on the top right as illustrated in FIG. 6B. The case of second electrode at the bottom gives a vertical field in the EO material while the case of second electrode at the top gives a horizontal field in the EO material. The horizontally applied field in the EO materials is particularly conducive for the case of modulators based on certain electro-optic material with high EO coefficient for horizontally applied field. Examples are certain EO crystal materials made of $LiNbO_3$, $BaTiO_3$, or semiconductors. The two side electrodes are placed to minimize overlapping of the two electrodes, and gives smaller capacitance for high speed modulation. The main resistance comes from the bridge part of the TC, as it is narrower. Therefore, this component can be made thicker to reduce resistance.

The device structure can be any shape depending on the application. By using mode solver and finite element method software, a device structure is provided as follows for a target $V_\pi=0.5V$. In the case of the bottom side electrode of FIG. 6A, the core layer SAS (n=1.6, $r_{33}=120$ pm/V) is 1 µm in thickness for single mode waveguide. A top cladding of Cytop (n=1.34) is 2.0 µm in thickness and 3 µm in width. A bottom cladding of $SiO_2$ is 2.0 µm in thickness. The overlapping of 2 TC electrodes is 5 µm for reducing capacitance. The gap between metal and ridge waveguide is 5 µm to keep low absorption from metal. TC electrode thickness is 0.1 µm in the waveguide part and 0.3 µm in non-waveguide part, for managing the resistance and TCO absorption as well. With the example structure above, a sample length=0.25 cm can be obtained for a $V_\pi=0.5V$. Depending on application and desired frequency response, with a 0.25 cm sample length, the absorption coefficient $\alpha$ of ZITO in order to keep $\alpha L\Gamma_{tc}<1$ dB, should be about 11 $cm^{-1}$.

With a fixed device structure, the required electric conductivity of ZITO can be deduced for a target bandwidth by using Eq (2), with consideration of the capacitance and resistance relationships discussed above. If a target bandwidth is 20 GHz, electric conductivity of a ZITO component should be >7.5 s/cm. Different target bandwidths will require different TCO electric conductivities. Table 4 shows a summary of TCO parameters at different frequency responses targeting $V_\pi=0.5V$ for up to a frequency of 100 GHz with high $r_{33}\sim120$ pm/V and targeting $V_\pi=5V$ for the still high-frequency of 1 GHz with low $r_{33}\sim12$ pm/V. In general, to achieve a reasonably high frequency of >about 1.0 GHz with any EO material's $r_{33}$ (whether low or high), the TC's conductivity should be >0.375 S/cm and optical absorption loss should be <11 $cm^{-1}$ or the conductivity to loss ratio should be >0.035 S.

Summary of TCO parameters at different frequency responses, targeting $V_\pi=0.5V$ or 5V with current flow from side structure.

TABLE 4

| | Target Bandwidth | | | |
| --- | --- | --- | --- | --- |
| | 1 GHz (5 V) $r_{33}=12$ pm/V | 20 GHz (0.5 V) $r_{33}=120$ pm/V | 40 GHz (0.5 V) $r_{33}=120$ pm/V | 100 GHz (0.5 V) $r_{33}=120$ pm/V |
| Conductivity $\sigma$ (s/cm) | >0.375 | >7.5 | >15.0 | >37.5 |
| Absorption $\alpha$ ($cm^{-1}$) | <11 | <11 | <11 | <11 |

For ZITO (Zn—In—Sn—O), materials, parameters are: absorption $\alpha\sim900$ $cm^{-1}$, conductivity $\sigma\sim2000$ S/cm. If TCO absorption can be reduced from 900 $cm^{-1}$ to 11 $cm^{-1}$, the conductivity is ~24 S/cm. Such a device can be capable of 60 GHz operation with $V_\pi=0.5V$ if only the RC limit is considered.

Example 2b

Example 2 with a 1 st/Top Electrode on Left and a 2nd/Bottom Electrode on Left

The metal electrodes (Au as an example) are placed on the side instead of the top of the TCO, to reduce metal loss (FIG. 7). A bottom metal placed on the left (same side as top electrode) enhances RF transmission performance, for high speed modulation. The TC parameter calculations for a target V, and representative frequency responses are based on the principles discussed with Example 2b.

Example 2c

Example 3 with a 1 st/Top Electrode on Left and a 2nd/Bottom Electrode Covering the Whole Bottom The metal electrodes (Au as an example) are placed on the side instead of the top of the TCO to reduce metal loss (FIG. 8). The bottom electrode is placed on the whole bottom, a simpler process since no TCO etching step is needed. Also RF shielding will be better for this structure. The TC calculation for a target $V_\pi$ and frequency response are based on the same principles as discussed above.

Example 3

High-Speed Design (Impedance, RC, Traveling Wave)

For an EO modulator design, $V_\pi$ is just one of the parameters to consider. Another consideration in a high-speed design or RF design is impedance. The TC materials are further electrically conducted to two metal electrodes, which can form an RF transmission line, with a certain RF transmission line impedance for an electric field pattern traveling down the RF transmission line as is well known to those skilled in the art, as the RF traveling-wave electrodes for the modulators. Such traveling-wave electrodes are used to further increase the modulation frequency bandwidth of the modulator. To achieve good modulation frequency characteristics and efficient RF power transfer from the electronic driver to the modulator, impedance matching can be very important. Usually the impedance of the transmission line needs to be ~50Ω to match the RF source and RF cable. Impedance of an EO modulator is related to metal structure (geometry) and dielectric material in between. Anything that can change capacitance will change impedance.

Figure 9B:
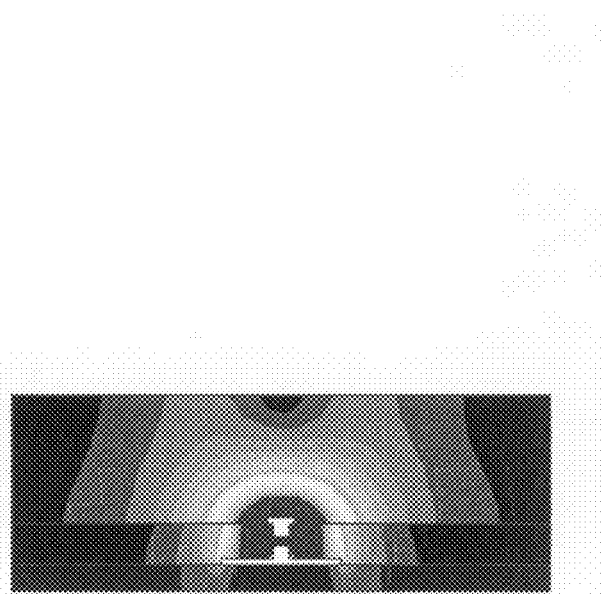

There are various ways to achieve a ~50Ω impedance. With simulation via finite element method, a device structure and electric field are shown in FIG. 9. For this device structure, the gap between top and bottom electrode is very small so the capacitance will be very large. As a result, the impedance would typically be small (<50 Ohms). In order to achieve 50 Ohms impedance, the device structure is optimized, by increasing electrode gap, reducing electrode width, etc. The optimized device structure (including all the dimensions and material) is shown in FIG. 9A. The electric field is shown in FIG. 9B. With this structure, impedance is ~50 Ohms.

Example 4

There are various ways to fabricate the modulator structures described above. FIG. 10 shows an exemplary approach. The modulator is made by several process steps, which begin with metal deposition. TCO is deposited on the metal by sputtering such as ion-assisted deposition, after which the polymer active layer is grown on the top of TCO. Then, another TCO layer is deposited on it. Finally, another metal layer is deposit on the top. The ridge structure is formed by etching, as known in the art. More specifically, the following steps can be taken to fabricate various modular structures of this invention:

Step 1: Deposit metal contact layer 2 on substrate. The substrate can be semiconductor wafer such as Si, GaAs, or InP. The thickness of substrate T6 is around 200-500 µm and metal thickness T5 is about 100 nm.

Step 2: Deposit TCO2 and EO material and TCO1 sequentially. The minimum thickness of TCO is determined by metal loss. TCO can be deposited by sputtering. EO materials are synthesized directly on the TCO surface via spin coating or a self-assembly process. EO materials are poled polymers or self-assembled synthesized EO materials.

Step 3: Spin coat or deposit etch mask on top of the multilayer structure. The etch mask pattern can be generated using photosensitive materials or transferred from photosensitive materials such as photoresist. The waveguide pattern will be formed by subsequent wet or dry etching.

Step 4: The patterned wafer will be planarized using dielectric films. Etch mask of previous step will be removed and metal contact 1 will be deposited. One example of a dielectric material is Cytop.

Step 5: Electrical contact area to metal contact 2 will be opened by etching away some of the planarization materials. Etching mask will be photosensitive materials such as photoresist.

Example 5

Another layer structure of this invention is shown in Table 5. Assuming the same dielectric constant of the cladding and EO materials of a prior art device, such TCO modulator can produce a 4-6 times stronger electric field, which in turn can provide a 4-6 times lower switching voltage, as compared to the prior art structure (NOA74 and AJL8 are designations for commercially available cladding and EO materials respectively).

TABLE 5

Layer structure of a TCO EO modulator.

| Layers | Material | Index | Thickness (µm) |
|---|---|---|---|
| Top cladding | NOA74 | 1.55 | 0.8 |
| Top electrode | TCO(In$_2$O$_3$) | 1.7-2 | 0.05 |
| EO material | AJL8 | 1.56 | 1.5 |
| Bottom electrode | TCO(ZnO) | 1.7-2 | 0.05 |
| Bottom cladding | SiO$_2$ | 1.48 | 2.5 |
| Substrate | GaAs | 3.4 | — |

Figures 11A, 11B:
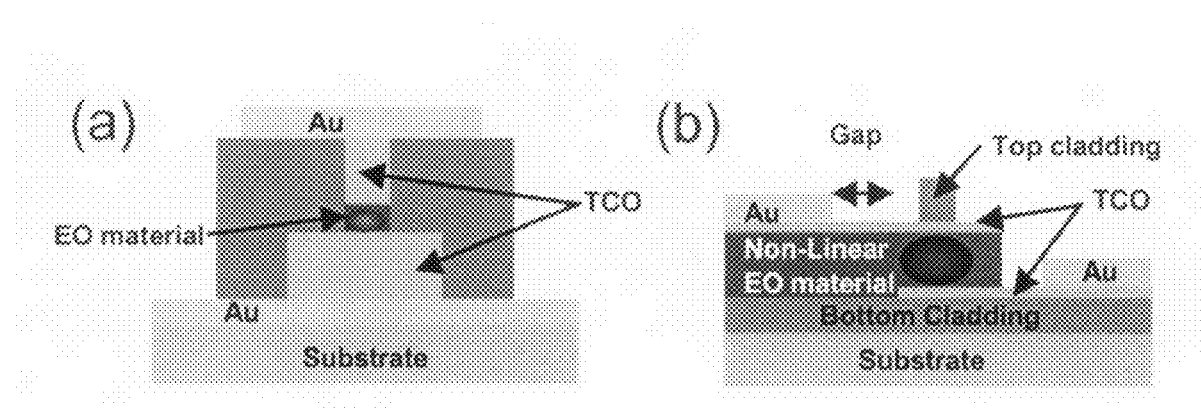

A straightforward structure for a TCO based EO modulator is a vertical conduction geometry that replaces all cladding materials with TCOs, as shown in FIG. 11A. However, in this structure the TCO cladding materials should have a lower refractive index than the waveguide core material and the optical loss must be low enough for practical modulator application. The application of current TCOs as electrodes in waveguide structure is restricted by the high optical loss and high refractive index of the material. Current TCOs usually have a higher refractive index (1.7-2.0) than most organic materials (~1.5) at a wavelength of 1.3-1.5 µm. Another available TCO modulator structure is via a side conduction geometry in which a thin but highly conductive layers of TCO bring the voltage to the top and bottom part of the active materials from two metallic electrodes on the side, as shown in FIG. 11B. In this geometry, as the TCO layer can be much thinner and will have a low overlapping factor with the optical field, it can have higher optical absorption coefficient and yet still keep a low waveguide optical loss. Another advantage of the side conduction geometry is that the TCO materials do not need to have lower refractive index than the waveguide core, as separate materials can be used for the top and bottom cladding layers above and below the thin TCO layers, respectively. Such components can be of the typical cladding materials with low refractive indices.

Example 6

RF transmission lines require the TCO electrodes to have low resistance while modulator waveguide requires the TCO materials to have low optical loss. Low optical loss and high conductivity cannot be achieved simultaneously. For materials having high conductivity, high carrier concentration will result in higher free carrier absorption. Hence there is a minimum requirement in terms of conductivity and optical loss to obtain specific modulation speeds. It is possible to estimate the minimum requirements of TCO conductivity and optical loss by simulating representative side conducting modulator structure. As discussed above, an important parameter is the $\sigma/\alpha$ ratio. It is, in general, desirable to achieve as high a $\sigma/\alpha$ ratio as possible for the TCO materials to optimize its application to high-speed and low voltage EO modulators.

For purposes of illustration, use the modulator structure summarized in Table 5 with the side conduction configuration. The thickness of the TCO layer on both sides of the waveguide core (FIG. 11B) is taken to be 50 nm. The optical energy confined in the TCO layers is ~1% and 80% of light is confined in the EO waveguide core layer. Assuming an EO material with EO coefficient of 60 pm/V, a device length of 0.5 cm will yield $\pi$ phase-shift switching voltage of 1V with a push-pull Mach-Zehnder configuration. The bulk optical loss of the TCO layers must be <45/cm with <20% waveguide propagation for 0.5 cm propagation length. With a high EO coefficient material, the modulator device can be shorter and yet still achieve same switching voltage, so the optical loss limitation can be reduced, providing use of TCO materials with low optical loss and good conductivity.

Example 7

The modeling of this example provides the basis for an RF transmission line design for the TCO modulator and illustrates the TCO conductivity needed to achieve operating speed above 20 GHz.

FIG. 12 shows, by diagram, the equivalent circuit of traveling-wave EO modulator with a TCO material as electrode. The TCO layer was modeled as a series resistance $R_s$. The series resistance per unit length of the TCO layer can be expressed as: $R_s = L_{TCO}/(\sigma_{TCO} t_{TCO})$, where $L_{TCO}$ is the distance between the waveguide and the metal transmission line, $\sigma_{TCO}$ is the TCO material conductivity and $t_{TCO}$ is the thickness of the TCO layer. In FIG. 12, $R_{con}$ is the metal transmission line conduction resistance, Lm is the metal inductance, Cp is the parasitic capacitance, and $C_m$ is the capacitance of the modulator. Using the circuit parameters in FIG. 21, all of the relevant microwave properties of a traveling wave TCO EO modulator can be derived from:

$$Z_m = \sqrt{(R_{con}+j\omega L_m)/(j\omega C_p 1/(R_s+1/j\omega C_m))}, \quad (3)$$

$$\gamma_\mu = \alpha_\mu + j\beta_\mu = \sqrt{(R_{con}+j\omega L_m)(j\omega C_p + 1/(R_s+1/j\omega C_m))}, \quad (4)$$

where, $Z_m$ is the impedance, $\gamma_\mu$ is the microwave propagation constant, $\alpha_\mu$ is the microwave attenuation and $\beta_\mu = \omega/v_\mu$ is the microwave propagation constant associated with the microwave phase velocity $v_\mu$.

By including multiple microwave reflections inside the modulator, RF voltage can be expressed as:

$$V_{RF} = \frac{V_0 T \exp(j\omega t)}{1 - \Gamma_L \Gamma_S \exp(-2\gamma_\mu L)}[\exp(-\gamma_\mu x) + \Gamma_L \exp(\gamma_\mu x - 2 - \gamma_\mu L)], \quad (5)$$

where $V_0$ is the input microwave voltage in the source transmission line, $\Gamma_s$ and $\Gamma_L$ are the microwave reflection coefficients at the source (x=0) and load position (x=L), $T=1-\Gamma_s$ is the amplitude transmission coefficient at the source port, $\omega$ is the microwave frequency. The effective voltage drop along the modulator with electrode length L is:

$$V_{eff} = \frac{1}{L}\int_0^L \frac{1/j\omega C_m}{R_s + 1/j\omega C_m} V_{RF}\left(x, t = t_0 + \frac{x}{v_0}\right)dx, \quad (6)$$

where, $v_0$ is the group velocity of the optical wave packet in the modulator waveguide.

The optical output of the MZ modulator is:

$$A_{out} = \frac{\sqrt{2}}{2}(A_1 e^{j\Phi_1} + A_2 e^{j\Phi_2}), \quad (7)$$

where $A_1$ and $A_2$ represent the optical amplitude in the two arms. $(A_1^2+A_2^2)$ is the total optical input power. $\Phi_1$ and $\Phi_2$ represent the optical phase delays. The output power is $$P_{out} = |A_{out}|^2 = \frac{1}{2}[A_1^2 + A_2^2 + 2A_1 A_2 \cos(\Phi_1 - \Phi_2)], \quad (8)$$

Optical intensity transfer function is defined as:

$$T_{MZ} = |A_{out}|^2 / [A_1^2 + A_2^2] = \frac{1}{2}[1 + b\cos(\Phi_1 - \Phi_2)], \quad (9)$$

where $b = 2A_1 A_2/(A_1^2+A_2^2)$ is the optical imbalance factor between the two arms. For EO modulator:

$$\Delta\Phi = \Phi_1 - \Phi_2 = \Gamma_{optical}\Delta n \frac{2\pi}{\lambda}L,$$

where $\Gamma_{optical}$ is the optical confinement factor of EO material layer, $\lambda$ is the optical wavelength, L is the modulation electrode length, $\Delta n$ is the optical index change in the EO layer, $$\Delta n = \frac{1}{2}n_0^3 r_{ij}\frac{V}{d}.$$

V/d is the applied electric field to the EO material with refractive index of no and EO coefficient of $r_{ij}$.

TABLE 6

TCO EO modulator simulation parameters.

| Parameters | Value |
|---|---|
| L | 0.5 cm |
| $L_{TCO}$ | 5 μm |
| $t_{TCO}$ | 5 μm |
| $C_m$ | 0.1 pF/mm |
| Cp | 0 pF/mm |
| $R_{con}$ | 3.5 Ωmm$^{-1}$GHz$^{-1/2}$ |
| $L_m$ | 0.1-1 nH/mm |
| $\Gamma_s$ | 0 |
| $\Gamma_l$ | 0 |

In the simulation, the device length is assumed 0.5 cm, EO coefficient $r_{ij}$=60 pm/V, $\Gamma_{optical}$=80%. EO layer thickness is 1.5 μm with index of 1.56. So the static π phase-shift switching voltage is 1V with a pull-push configuration. Total thickness $t_{TCO}$ of the TCO layer is assumed 100 nm (50 nm each electrode) for the operating wavelength range of 1000 nm to 1500 nm, and the gap $L_{TCO}$ between waveguide and metal transmission line is 5 μm on each TCO electrodes. This thickness will keep the TCO layer thickness smaller than about λ/5 in which λ is the wavelength of the optical beam being modulated, which is important so that the high-refractive-index TCO will not affect the waveguiding property of optical beam. The unit length series resistance of TCO layer can be expressed as: Rs=$L_{TCO}$/($\sigma_{TCO} t_{TCO}$), where $\sigma_{TCO}$ is the conductivity of TCO layer. The capacitance per unit length of the device is calculated to be 0.1 pF/mm. For the transmission line parameters, take some typical value from a semiconductor modulator. $R_{con}$~3.5 Ωmm$^{-1}$ GHz$^{-1/2}$, Lm will fall in the range of 0.1-1 nH/mm. For simplicity, assume Cp=0. FIG. 13 shows the dependence of RF speed (A), modulator impendence (B) and modulation bandwidth on conductivity of TCO. With the TCO conductivity larger than 50 S/cm, the TCO modulator can operate above 20 GHz. Accordingly, a figure-of-merit for the TCO material can be 50/45 (S)~1 S. Higher EO coefficient materials will have even lower figures-of-merit since the device can be made shorter. The above analysis illustrated that for a preferred embodiment of the present invention to achieve 20 GHz frequency response for a modulator based on an exemplary EO material with a EO coefficient of $r_{ij}$=60 pm/V, a TCO figure of merit of ~1 S is sufficient. Thus, depending on the EO coefficient and frequency response requirements, TCO materials of >0.1 S are typically desirable for GHz frequency response with typical EO coefficients of tens of pm/V or higher.

Example 8a

TCOs are widely used in display applications as transparent electrodes, where optical loss of the TCO layer is not of great concern due to the small thickness in display applications. However, in a TCO modulator, the optical loss of the TCO layer can be an important factors since the modulator length will be at the centimeter level. The optical loss of $In_2O_3$ and ZnO films grown by ion-assisted deposition (IAD) techniques and by metal-organic chemical vapor deposition (MOCVD) were studied. For IAD deposition, pure $In_2O_3$ and ZnO was used as the target material and the film carrier concentration was controlled by the oxygen flow to the target and assist beam. The chamber pressure during sputtering was ~4 mT and growth rate was ~2.4 nm/min. Table 7 lists the electrical properties of an $In_2O_3$ film deposited on glass with different $O_2$ flow. As shown, carrier concentration can be effectively controlled by $O_2$ partial pressure while the mobility of the film has no obvious change. In order to achieve the minimal device requirement of conductivity higher than about 0.01 S/cm in Table 2 or Table 4, it is seen from Table 7 that a carrier concentration of larger than about $1\times10^{16}$ is sufficient. The optical transmission properties of the film were measured, as shown in FIG. 15. It can be seen that free carrier absorption plays an important role in the infrared region.

TABLE 7

Electrical properties of $In_2O_3$ film deposited by IAD with different $O_2$ partial pressure.

| Sample | $O_2$ flow (Target/Assist Beam) (sccm) | Conductivity (S/cm) | Mobility (cm$^2$/Vs) | Carrier Conc. (cm$^{-3}$) |
|---|---|---|---|---|
| 1 | 15/0 | 845 | 25 | $2.2 \times 10^{20}$ |
| 3 | 15/3 | 311 | 27 | $7.3 \times 10^{19}$ |
| 4 | 25/3 | 65 | 29 | $1.4 \times 10^{19}$ |
| 7 | 25/3.5 | 21 | 30 | $4.3 \times 10^{18}$ |

Example 8b

The TCO film optical loss was also measured using waveguide techniques, since this method gives more accurate data in the low loss region. Table 8 lists the optical loss of the TCO films and their corresponding electrical properties. It can be seen that IAD deposited $In_2O_3$ films exhibit a higher level optical loss compared with IAD deposited ZnO film with same level of carrier concentration. However, IAD-deposited $In_2O_3$ films have a much larger conductivity. Therefore the σ/α ratio of IAD-deposited $In_2O_3$ is much greater than that of IAD-deposited ZnO.

TABLE 8

TCOs bulk optical loss and their properties deposited by IAD and MOCVD.

| Materials | Growth method | Carrier Concentration (/cm$^3$) | Mobility (cm$^2$/Vs) | Conductivity σ (S/cm) | Optical loss α (/cm) | σ/α |
|---|---|---|---|---|---|---|
| In2O3 | IAD | $1.5 \times (10)^{20}$ | 27 | 300 | 2000 | 0.15 |
| In2O3 | IAD | $1.0 \times (10)^{19}$ | 28 | 48 | 800 | 0.06 |

TABLE 8-continued

TCOs bulk optical loss and their properties deposited by IAD and MOCVD.

| Materials | Growth method | Carrier Concentration (/cm$^3$) | Mobility (cm$^2$/Vs) | Conductivity $\sigma$ (S/cm) | Optical loss $\alpha$ (/cm) | $\sigma/\alpha$ |
|---|---|---|---|---|---|---|
| ZnO | IAD | $2.48 \times (10)^{19}$ | 1.3 | 5 | 100 | 0.05 |
| ZnO | MOCVD | $2.87 \times 10^{19}$ | 11.7 | 54 | 20 | 2 |

Example 8c

In MOCVD ZnO growth, the precursor for Zn is Zn(hfa)$_2$ (N,N'-DEEDA) which is purified by multiple vacuum-sublimation (J. Ni, H. Yan, A. Wang, Y. Yang, C. L. Stern, A. W. Metz, S. Jin, L. Wang, T. J. Marks, J. R. Ireland, C. R. Kannewurf, J. Am. Chem. Soc., 127, 5613-5624, 2005). The optimized growth temperature is around 450° C. with growth rate of 2 nm/min, which gives highest mobility. As listed in Table 8, MOCVD-grown ZnO has a much greater mobility and lower optical loss than IAD-grown ZnO. This may reflect the better film quality of MOCVD-grown ZnO, such as larger crystallites and more condensed grain structure at high growth temperature. The $\sigma/\alpha$ ratio of MOCVD-grown ZnO is sufficient for high-speed TCO modulator applications of the sort described herein. In the TCO modulator fabrication efforts discussed below, MOCVD-grown ZnO was employed as bottom TCO electrode while the top TCO electrode was IAD-grown In$_2$O$_3$, since the growth temperature of MOCVD ZnO is not compatible with organic EO films.

Example 9

With reference to example 4, an organic TCO EO modulator can be fabricated to demonstrate the modulation voltage reduction by using TCOs associated electrodes. (See FIG. 11B, with reference to Table 5.) A bottom cladding of 2.5 μm thick SiO$_2$ was first deposited on a GaAs wafer by plasma-enhanced chemical vapor deposition (PECVD) techniques. The typical growth temperature was ~300° C. and the refractive index of SiO$_2$ was measured to be 1.48. The SiO$_2$ thickness of 2.5 μm was determined by keeping the substrate coupling loss to be less than 0.1/cm. The bottom electrode material was ZnO grown, using known techniques, by low-pressure MOCVD at 450° C. and has a thickness of 50 nm. The bottom ZnO electrode was patterned using standard photolithography and wet etching techniques. A nonlinear organic EO material representative of those useful herewith (25% in amorphous poly(carbonate) (APC) host) was directly spin coated on bottom ZnO electrode. The thickness of the EO layer was ~1.5 μm. A poling protective layer of 1.5 μm poly (4-vinylphenol) (PVP) was spin-coated on top of the EO layer before depositing metal electrodes for the poling process. The film was then poled at 140° C. with a poling voltage of 300 V for 5 mins, then cooled down to room temperature while keeping the electric field applied to the sample. After the poling procedure, the top metal electrode was etched away using wet chemical etching and the poling protective layer (PVP layer) was washed away using methanol. Then a 30 nm In$_2$O$_3$ top electrode was deposited using the IAD system at room temperature. The top IAD In$_2$O$_3$ electrode pattern was defined by a shadow mask. Above the top electrode, a thin cladding layer was spin-coated and UV cured at room temperature. A ridge waveguide structure with a thickness of 0.8 μm and width of 3 μm was next formed using photolithography and RIE O$_2$ plasma etching. As discussed elsewhere herein, various other TCO materials and acentric, non-poled EO materials can be used with comparable effect in a range of device structures, consistent with broader aspects of this invention.

Example 10

The switching voltage of a TCO modulator fabricated, as described below, was measured using a single straight waveguide with λ=1.31 μm light from a DFB laser diode coupled into the modulator waveguide using an optical objective lens. Two polarizers with polarization perpendicular to each other and at 450 to the applied field on the modulator were used to analyze the phase change of the TE/TM mode before and after the modulation. An oscilloscope was used to record the applied voltage and output light intensity.

FIG. 14 shows the typical EO response of the TCO modulator. Trace 1 and 2 in FIG. 14 represent the applied voltage signal and response signal of the modulator, respectively. The half-wave voltage $V_\pi$ is measured to be 2.8V for an 8 mm long waveguide. The EO coefficient of the poled polymer was calculated to be about 35 pm/V by using the above device parameters. Using the same poling conditions, the EO coefficient is measured to be 68 pm/V immediately after poling. The reduction of the EO coefficient in the actual sample is likely due to the thermal treatment process after poling.

A figure of merit of EO modulator performance is the voltage and interaction length product $V_\pi L$. For this non-limiting TCO modulator, $V_\pi L$=1.1 V·cm is achieved with a non push-pull geometry. This is small considering the EO coefficient of the active material is 35 pm/V. For a conventional structure with a push-pull configuration, the $V_\pi L$ is 2.2 V·cm with a EO coefficient of 58 pm/V. Thus, for the same EO coefficient and push-pull electrode configuration, the TCO modulator has a 6.5 times lower switching voltage. Part of this reduction (~5×) comes from reducing the electrode separation from 7.5 μm to 1.5 μm. Stronger mode confinement for the TCO modulator due to the use of higher refractive index contrast between the waveguide core and cladding also contributes to its lower switching voltage.

We claim:

1. A top-down conduction electro-optic modulator device operable at a switching voltage, said device comprising:
  a waveguide comprising a core component comprising a non-linear electro-optical material, said core component having a refractive index, and opposed optically-transparent electrically-conductive waveguide cladding components, each said cladding component directly contacting said core component and having a refractive index less than said core component refractive index at an operative wavelength from about 0.2 μm to about 1.8 μm; and vertically-opposed electrode components above and below said core component, each said electrode component coupled to said waveguide component with a said cladding component, each said cladding component comprising a transparent conducting metal oxide compound providing a transparency and an electrical conductivity for a frequency response at said switching voltage.

2. The device of claim 1 wherein each said transparent metal oxide cladding component is coupled to a metal electrode, said device incorporated into an RF transmission line apparatus.

3. The device of claim 1 wherein the conductivity of each said cladding component is at least partially a function of the carrier concentration of said transparent conducting metal oxide compound.

4. The device of claim 3 wherein said carrier concentration is greater than about $1.0 \times 10^{16}/cm^3$.

5. The device of claim 4 wherein said conductivity is greater than about 0.01 S/cm.

6. The device of claim 5 wherein the ratio of conductivity to optical loss coefficient is greater than about 0.002 S.

7. The device of claim 1 in which the frequency response is greater than about 1 gigahertz.

8. The device of claim 7 in which the said voltage is lower than about 5 volts.

9. A side conduction electro-optic modulator device operable at a switching voltage, said device comprising:

a waveguide comprising a core component comprising a non-linear electro-optical material, said core component having a refractive index, and opposed optically-transparent electrically-conductive waveguide cladding components, a portion of one said cladding component above and directly contacting said core component and a portion of another said cladding component below and directly contacting said core component, each said cladding component having a refractive index one of equal to and greater than said core component refractive index at an operative wavelength from about 0.2 µm to about 1.8 µm; and opposed electrode components, at least one said electrode component positioned to a side of said core component, each said electrode component coupled to said waveguide component with a said cladding component, each said cladding component comprising a transparent conducting metal oxide compound providing a transparency and electrical conductivity for a frequency response at a said switching voltage.

10. The device of claim 9 wherein each said cladding component comprises a material having a refractive index one of equal to and less than said core component refractive index.

11. A side conduction electro-optic modulator device operable at a switching voltage, said device comprising:

a waveguide comprising a core component comprising a non-linear electro-optical material, said core component having a refractive index, and opposed optically-transparent electrically-conductive waveguide cladding components, a portion of one said cladding component above and directly contacting said core component and a portion of another said cladding component below and directly contacting said core component, each said cladding component having a refractive index one of equal to and greater than said core component refractive index at an operative wavelength from about 0.2 µm to about 1.8 µm; and opposed electrode components, at least one said electrode component positioned to a side of said core component, each said electrode component coupled to said waveguide component with a said cladding component, each said cladding component comprising a transparent conducting metal oxide compound providing a transparency and electrical conductivity for a frequency response at a said switching voltage.

12. The device of claim 11 in which the frequency response is greater than about 20 gigahertz.

13. The device of claim 12 in which the said voltage is lower than about 5 volts.

14. The device of claim 11 wherein the conductivity of each said cladding component is at least partially a function of the carrier concentration of said transparent conducting metal oxide compound.

15. The device of claim 14 wherein said carrier concentration is greater than about $1.0 \times 10^{19}/cm^3$.

16. The device of claim 15 wherein said conductivity is greater than about 0.375 S/cm.

17. The device of claim 16 wherein the ratio of conductivity to optical loss coefficient is less than about 0.035 S.

18. The device of claim 17 in which the frequency response is greater than about 1 gigahertz.

19. The device of claim 18 in which the said voltage is lower than about 5 volts.

20. The device of claim 11 comprising at least one of an upper and lower second cladding component, said second cladding component comprising a material having a refractive index less than said core refractive index, for vertical waveguiding.

21. The device of claim 11 wherein each said transparent conducting oxide cladding component is coupled to a metal electrode, said device incorporated into an RF transmission line apparatus.

22. The device of claim 11 wherein each said cladding component has a thickness dimension thinner than about $\lambda/5$ where $\lambda$ is the wavelength of the optical beam being modulated.

23. The device of claim 11 wherein said thickness dimension ranges from about 50 nm to about 100 nm, said device configured for modulation at a wavelength ranging from about 1000 nm to about 1550 nm.

* * * * *

UNITED STATES PATENT AND TRADEMARK OFFICE
CERTIFICATE OF CORRECTION

| | | |
|---|---|---|
| PATENT NO. | : 7,835,597 B2 | Page 1 of 1 |
| APPLICATION NO. | : 11/888503 | |
| DATED | : November 16, 2010 | |
| INVENTOR(S) | : Marks et al. | |

It is certified that error appears in the above-identified patent and that said Letters Patent is hereby corrected as shown below:

Column 1, lines 13-16:
"The United States government has certain rights to Grant No. DAAD-19-00-1-0368 from DARPA and Grant No. DMR-00769097 from the National Science Foundation to Northwestern Univeristy." should read --This invention was made with government support under Grant No. DAAD-19-00-1-0368 awarded by the Army Research Office and Grant No. DMR-00769097 awarded by the National Science Foundation. The government has certain rights in the invention.--

Signed and Sealed this
Fourth Day of October, 2011

David J. Kappos
*Director of the United States Patent and Trademark Office*